United States Patent
Weidl

(10) Patent No.: US 12,458,105 B2
(45) Date of Patent: Nov. 4, 2025

(54) SOLE FOR SPORTS SHOES

(71) Applicant: adidas AG, Herzogenaurach (DE)

(72) Inventor: Jürgen Weidl, Herzogenaurach (DE)

(73) Assignee: adidas AG, Herzogenaurach (DE)

( * ) Notice: Subject to any disclaimer, the term of this patent is extended or adjusted under 35 U.S.C. 154(b) by 483 days.

(21) Appl. No.: 16/867,945

(22) Filed: May 6, 2020

(65) Prior Publication Data

US 2020/0260821 A1 Aug. 20, 2020

Related U.S. Application Data

(62) Division of application No. 15/066,481, filed on Mar. 10, 2016, now Pat. No. 10,660,403.

(30) Foreign Application Priority Data

Mar. 10, 2015 (DE) .......................... 102015204268.5

(51) Int. Cl.
*A43B 13/22* (2006.01)
*A43B 13/26* (2006.01)
(Continued)

(52) U.S. Cl.
CPC ............ *A43B 13/223* (2013.01); *A43B 13/26* (2013.01); *A43B 23/042* (2013.01); *A43B 23/17* (2013.01); *B29D 35/142* (2013.01); *B29D 35/148* (2013.01)

(58) Field of Classification Search
CPC ..... A43B 13/223; A43B 13/26; A43B 23/042; A43B 23/17; A43B 7/18; A43B 23/04;
(Continued)

(56) References Cited

U.S. PATENT DOCUMENTS 2,600,507 A * 6/1952 Leahy ................ B29D 35/0009
141/82
2,794,270 A * 6/1957 Dubner .................... A43B 7/28
36/43

(Continued)

FOREIGN PATENT DOCUMENTS

CN 1993064 7/2007
CN 103179872 6/2013
(Continued)

OTHER PUBLICATIONS

European Application No. 18189433.8, Office Action mailed on Sep. 28, 2021, 7 pages.

(Continued)

*Primary Examiner* — Heather Mangine
*Assistant Examiner* — Raquel M. Weis
(74) *Attorney, Agent, or Firm* — Kilpatrick Townsend & Stockton LLP

(57) ABSTRACT

Described are methods for manufacturing a sole, in particular, a sole for a sports shoe, comprising providing at least one first sole element and at least one second sole element; and injecting at least one second sole element through the at least one first sole element. Also described are methods for manufacturing a shoe, in particular a sport shoe, wherein the method comprising: providing a flexible sock element and at least one sole element; injecting the at least one sole element on the flexible sock element, such that the at least one sole element comprises a stiffening element below the arch of the foot.

11 Claims, 13 Drawing Sheets

(51) Int. Cl.
*A43B 23/04* (2006.01)
*A43B 23/17* (2006.01)
*B29D 35/14* (2010.01)

(58) Field of Classification Search
CPC ...... A43B 23/22; A41D 25/003; B29D 35/10; B29D 35/142; B29D 35/148; B29D 35/061; B29D 35/081; B29D 35/0009; B29D 35/02; B29D 35/04; B29D 35/082
See application file for complete search history.

(56) References Cited

U.S. PATENT DOCUMENTS

| | | | | |
|---|---|---|---|---|
| 3,116,566 A * | 1/1964 | Ferreira | ........ | B29D 35/065 36/30 R |
| 3,175,249 A * | 3/1965 | Ferreira | ........ | B29D 35/061 425/569 |
| 3,178,496 A * | 4/1965 | Ferreira | ........ | B29D 35/061 249/82 |
| 3,246,068 A * | 4/1966 | Ferreira | ........ | B29D 35/061 264/278 |
| 3,375,537 A * | 4/1968 | Cali | ........ | B29D 35/0018 36/12 |
| 3,376,608 A * | 4/1968 | Wilcox | ........ | B29D 35/081 249/109 |
| 3,447,251 A * | 6/1969 | Drexler | ........ | B29D 35/065 425/119 |
| 3,452,378 A * | 7/1969 | Ferreira | ........ | B29D 35/061 264/277 |
| 3,463,849 A * | 8/1969 | Winkler | ........ | B29D 35/081 425/577 |
| 3,474,496 A * | 10/1969 | Klee | ........ | A43B 13/04 425/577 |
| 3,480,704 A * | 11/1969 | Ludwig | ........ | B29D 35/081 264/45.2 |
| 3,499,190 A * | 3/1970 | Ludwig | ........ | B29D 35/0018 425/577 |
| 3,522,340 A * | 7/1970 | Corcoran | ........ | B29C 45/2708 264/161 |
| 3,662,415 A * | 5/1972 | Doane | ........ | B29D 35/061 12/145 |
| 3,949,040 A * | 4/1976 | Drab | ........ | B29D 35/085 264/161 |
| 4,292,746 A * | 10/1981 | Delaney | ........ | A43B 5/06 36/83 |
| 4,380,878 A * | 4/1983 | Skaja | ........ | A43C 15/167 36/129 |
| 4,447,967 A * | 5/1984 | Zaino | ........ | B29D 35/064 36/87 |
| 4,651,444 A * | 3/1987 | Ours | ........ | B29D 35/084 12/142 T |
| 4,712,318 A * | 12/1987 | Greiner | ........ | A43C 15/161 36/134 |
| 4,787,156 A * | 11/1988 | Bade | ........ | B29D 35/081 425/588 |
| 4,858,343 A * | 8/1989 | Flemming | ........ | A43B 13/26 D2/955 |
| 5,890,248 A * | 4/1999 | Gee | ........ | B29D 35/10 12/146 B |
| 5,955,017 A * | 9/1999 | Foffano | ........ | B29D 35/10 264/161 |
| 6,000,923 A * | 12/1999 | Lo | ........ | B29C 33/301 425/588 |
| 6,149,852 A * | 11/2000 | Romanato | ........ | A43B 5/002 264/246 |
| 6,676,782 B2 * | 1/2004 | Chi | ........ | A43B 13/12 156/245 |
| 7,081,221 B2 * | 7/2006 | Paratore | ........ | B29D 35/10 264/161 |
| 7,704,430 B2 * | 4/2010 | Johnson | ........ | A43B 13/223 264/273 |
| 8,640,291 B2 * | 2/2014 | Fleming | ........ | A43B 9/12 12/142 T |
| 9,271,541 B2 * | 3/2016 | Biancucci | ........ | A43B 13/16 |
| 10,660,403 B2 * | 5/2020 | Weidl | ........ | B29D 35/142 |
| 2002/0166261 A1* | 11/2002 | Safdeye | ........ | A43B 13/12 36/103 |
| 2002/0170650 A1* | 11/2002 | Chi | ........ | B29C 44/1233 156/79 |
| 2003/0009919 A1* | 1/2003 | Stein | ........ | A43B 13/26 36/59 R |
| 2010/0031531 A1* | 2/2010 | Baucom | ........ | A43B 13/12 36/43 |
| 2010/0236098 A1* | 9/2010 | Morgan | ........ | A43B 7/144 12/146 B |
| 2011/0078922 A1* | 4/2011 | Cavaliere | ........ | B29D 35/126 36/77 R |
| 2011/0283561 A1* | 11/2011 | Xie | ........ | A43B 7/144 36/43 |
| 2012/0180343 A1* | 7/2012 | Auger | ........ | A43B 1/0009 12/146 B |
| 2013/0067772 A1* | 3/2013 | Auger | ........ | A43B 13/188 36/103 |
| 2013/0067774 A1* | 3/2013 | Auger | ........ | A43B 13/188 36/103 |
| 2013/0133229 A1* | 5/2013 | Ludemann | ........ | B29D 35/04 12/146 B |
| 2013/0152430 A1* | 6/2013 | Bier | ........ | B29D 35/081 12/146 B |
| 2013/0160328 A1* | 6/2013 | Hatfield | ........ | A43B 7/20 36/103 |
| 2013/0185956 A1* | 7/2013 | Biancucci | ........ | A43B 13/14 36/28 |
| 2014/0366402 A1* | 12/2014 | Cavaliere | ........ | A43C 15/161 12/146 B |
| 2015/0013187 A1* | 1/2015 | Taniguchi | ........ | A43B 23/0235 12/142 R |
| 2015/0181977 A1* | 7/2015 | Klug | ........ | A43C 15/161 36/134 |
| 2015/0189947 A1* | 7/2015 | Klug | ........ | A43B 13/22 36/103 |
| 2016/0136910 A1* | 5/2016 | Krajcir | ........ | A43B 13/04 12/146 B |
| 2016/0206048 A1* | 7/2016 | Weidl | ........ | A43B 13/26 |

FOREIGN PATENT DOCUMENTS

| | | |
|---|---|---|
| DE | 3440567 | 5/1986 |
| EP | 1468815 | 10/2004 |
| EP | 1579778 | 9/2005 |
| EP | 1612035 | 1/2006 |
| EP | 2815668 | 12/2014 |
| GB | 986237 | 3/1965 |
| GB | 2093756 | 9/1982 |
| GB | 2292878 | 3/1996 |
| GB | 2479220 | 10/2011 |
| JP | 02136506 | 11/1990 |
| JP | H0693842 | 11/1994 |
| JP | 0956411 | 3/1997 |
| JP | 2007136145 W | 6/2007 |
| JP | 2010178770 | 8/2010 |
| JP | 2014509920 | 4/2014 |
| WO | 2013121578 | 8/2013 |
| WO | 2014022588 | 2/2014 |
| WO | 2014115284 | 7/2014 |

OTHER PUBLICATIONS

German Patent Application No. 102015204268.5, Office Action mailed Dec. 21, 2021, 14 pages (English machine translation provided).
Blattner, Max, Fachbuch alles über Schuhe, 2. Auflage, Rapperswil, Schweizer Schuhhändler-Verb., 2003; S. IV-2-6-IV-2-17; ISBN 3-9522096-6-X, 12 pages of English translation and 12 pages of original document.
Chinese Patent Application No. 201610134999.8, Office Action mailed May 25, 2017, 9 pages (No English translation available. A

(56) References Cited

OTHER PUBLICATIONS summary of the Office Action was provided in the Transmittal Letter submitted with the IDS filed Sep. 15, 2017.).
German Patent Application No. 102015204268.5, Office Action mailed Jul. 4, 2017, 6 pages (No English translation available. A summary of the Office Action was provided in the Transmittal Letter submitted with the IDS filed Dec. 22, 2017.).
German Patent Application No. 102015204268.5, Office Action mailed Oct. 29, 2016, 6 pages (No English translation available. A summary of the Office Action was provided in the Transmittal Letter submitted with the IDS filed Mar. 10, 2016.).
European Patent Application No. 16159562.4, Extended European Search Report mailed Oct. 28, 2016, 6 pages.
European Patent Application No. 16159562.4, European Search Report mailed on Mar. 16, 2017, 11 pages.
European Patent Application No. 18189433.8, Extended European Search Report mailed Nov. 13, 2018, 7 pages.
Japanese Patent Application No. 2016-046213, Office Action mailed on Aug. 28, 2018, 18 pages (10 pages of Original Document and 8 pages of English Translation).
Japanese Patent Application No. 2016-046213, Office Action mailed May 14, 2019, 8 pages (machine English translation provided).
Office Action, German Patent Application No. 10 2015 204 268.5, May 23, 2024, 8 pages.

\* cited by examiner

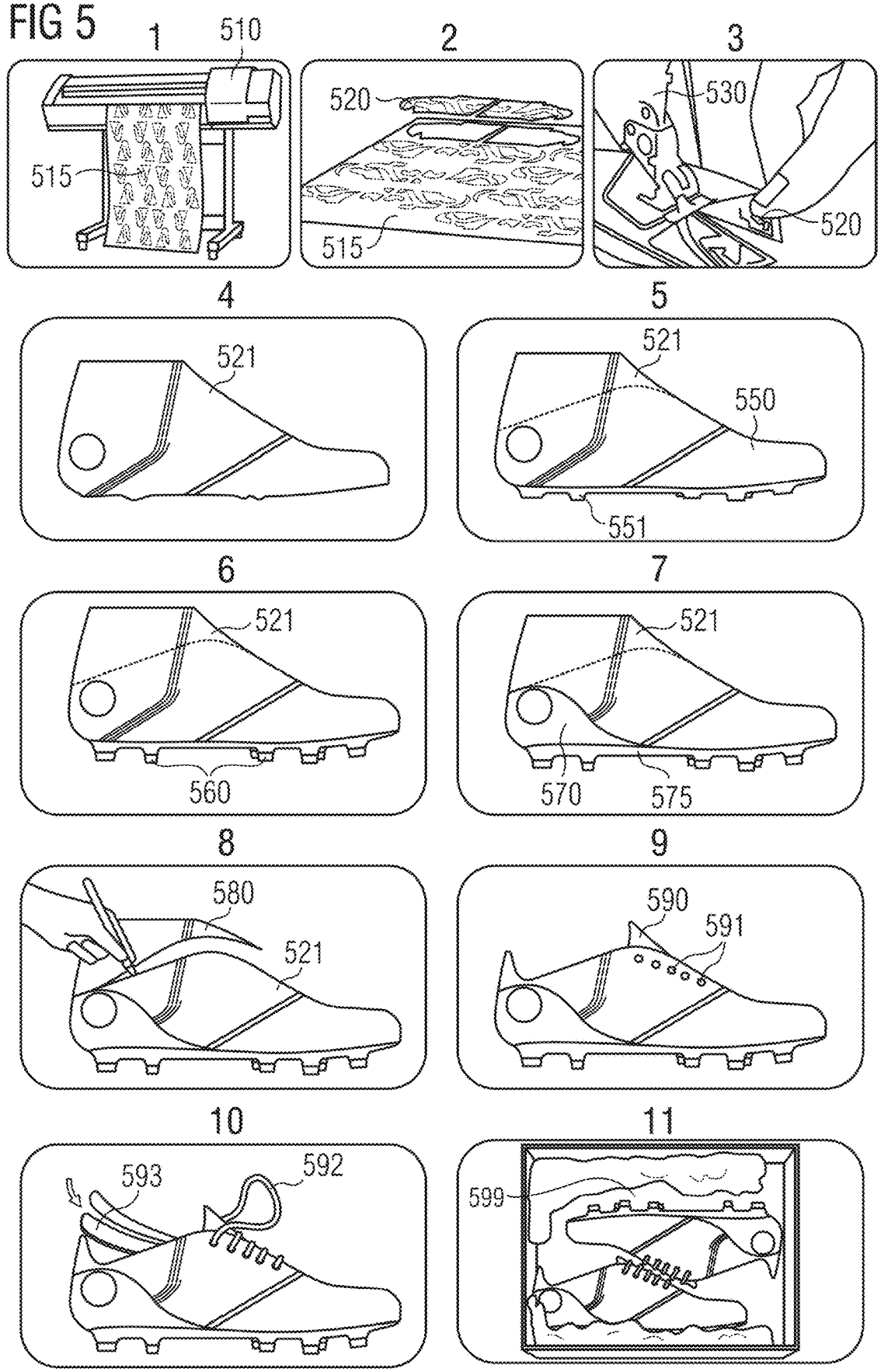

SOLE FOR SPORTS SHOES

CROSS REFERENCE TO RELATED APPLICATION

This application is a divisional of U.S. patent application Ser. No. 15/066,481, filed on Mar. 10, 2016, entitled "Sole for Sports Shoes" (Allowed) ("the '481 application), and is related to and claims priority benefits from German Patent Application No. DE102015204268.5, filed on Mar. 10, 2015, entitled "Sole for sports shoes, as well as their manufacturing" ("the '268.5 application"). The '268.5 and '481 applications are hereby incorporated herein in their entirety by this reference.

FIELD OF THE INVENTION

The present invention relates to a sole, in particular, a sole for a sports shoe, as well as a method for manufacturing said sole. Moreover, the invention relates to a shoe, in particular, a sports shoe, as well as a method for manufacturing said shoe.

BACKGROUND

Shoes, in particular, sports shoes, generally have a sole and a shoe upper. The sole of the shoe protects the foot from injuries, which may, for example, result from stepping on sharp objects. The sole may also increase the traction for the wearer of the shoe. The shoe upper holds the foot within the shoe and on the sole. Further, the shoe upper may provide stability to the foot, for example, by preventing the foot from twisting during fast movements. Moreover, the shoe upper may protect the foot from outside influences, such as water and dirt.

Shoe uppers and shoe soles have different requirements. Therefore, a sole is usually manufactured from a different material than a shoe upper, and the sole is attached to the shoe upper after manufacturing. Soles may, for example, be stitched, glued or nailed to shoe uppers. Also, a sole or a shoe upper often have different requirements that have to be met in different regions, thus the sole or the shoe upper may each be composed of several individual constituents.

Manufacturing methods for such multi-part shoes require that the individual constituents of the shoes are, for example, punched or cut in a multitude of separate fabrication steps. This not only leads to a labor-intensive and complex manufacturing method, but also produces a large amount of waste in the form of arising scraps. Moreover, the individual constituents have to be connected to each other, for example, stitched or glued, and often must be connected manually. This adds to the intensity and complexity of the labor. Furthermore, when gluing, for example, often solvents are used, which are harmful to the environment.

EP 2 815 668 A1 discloses a method for manufacturing a shoe, in which a sock-shaped base member is attached to a last portion. A molten resin is supplied and allowed to cure on the base member.

Various approaches are known for using injection molding for manufacturing a shoe.

DE 34 40 567 A1 discloses a sports shoe with an injected sole and injected pins.

U.S. Pat. No. 4,447,967 discloses a shoe, which is manufactured by injecting a plastic material onto a sock. In order to ensure a secure bonding of the plastic material and the sock, the sock comprises a base part formed of a less dense fabric, which is penetrated by mutually intersecting ribs of the plastic material.

However, the known approaches for injecting parts of shoes have several disadvantages regarding the stability of the shoe and, apart from that, technical implementations of the known approaches are difficult. In view of this background, it is an object of the present invention to improve the provision of shoes and soles by injection molding.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a method for manufacturing a sole comprises assembling at least one first sole element with at least one second sole element by injecting the at least one second sole element through the at least one first sole element.

In some embodiments, the at least one first sole element comprises a profile element. The at least one first sole element, in certain embodiments, comprises an aperture.

In certain embodiments, the at least one second sole element comprises at least one of the following synthetic materials: polyamide, polyether-block-amide, polyvinylchloride, polyurethane, and polyvinylchloride.

The at least one first sole element, in some embodiments, is provided at a flexible sock element.

In some embodiments, the flexible sock element comprises a textile.

In certain embodiments, the at least one second sole element forms an outsole element.

The method, in certain embodiments, further comprises a step of injecting a reinforcing element for the flexible sock element, wherein the providing of the at least one first sole element at the flexible sock element comprises a step of injecting or clipping the at least one first sole element onto the reinforcing element.

In some embodiments, the reinforcing element comprises a Shore-A hardness of approximately 25 to 75. The at least one first sole element, in some embodiments, comprises a Shore-A hardness of approximately 55 to 95 and the at least one second sole element comprises a Shore-A hardness of approximately 70 to 90.

According to certain embodiments of the present invention, a sole is manufactured by providing at least one first sole element and at least one second sole element and injecting the at least one second sole element through the at least one first sole element. A shoe, in certain embodiments, comprises the sole.

According to certain embodiments of the present invention, a method for manufacturing a shoe comprises providing a flexible sock element and at least one sole element, and injecting the at least one sole element onto the flexible sock element, such that the at least one sole element comprises a stiffening element located (at a region) below the arch of the foot.

In some embodiments, the stiffening element is aligned along a longitudinal direction of the shoe. The stiffening element, in certain embodiments, extends from a region below the heel to a region below the metatarsals.

In certain embodiments, the stiffening element comprises a Shore-A hardness of approximately 25 to 65.

The flexible sock element, in some embodiments, is provided with a protrusion, and the at least one sole element is injected such that the at least one sole element, at least in part, encompasses the protrusion to provide a form-fitting connection between the flexible sock element and the at least one sole element.

In certain embodiments, the flexible sock element is provided with an indentation, and the at least one sole element is injected such that the at least one sole element, at least in part, penetrates into the indentation, to provide a form-fitting connection between the flexible sock element and the at least one sole element.

In some embodiments, the method further comprises a step of providing a sole plate element with an elevation at the flexible sock element, and the at least one sole element is injected, such that the at least one sole element, at least in part, encompasses the elevation to provide a form-fitting connection between the flexible sock element and the at least one sole element.

The method, in certain embodiments, further comprises a step of providing a sole plate element with a recess at the flexible sock element, and the at least one sole element is injected, such that the at least one sole element, at least in part, penetrates into the recess to provide a form-fitting connection between the flexible sock element and the at least one sole element.

According to certain embodiments of the present invention, a shoe comprises a flexible sock element and at least one sole element, wherein the at least one sole element is injected onto the flexible sock element and the at least one sole element comprises a stiffening element located (in a region) below the arch of the foot.

BRIEF DESCRIPTION OF THE DRAWINGS

In the following detailed description, embodiments of the invention are described referring to the following figures:

FIG. 5 shows a method for fabricating a shoe with a flexible sock element and a sole with profile element.

BRIEF DESCRIPTION

Figure 1:
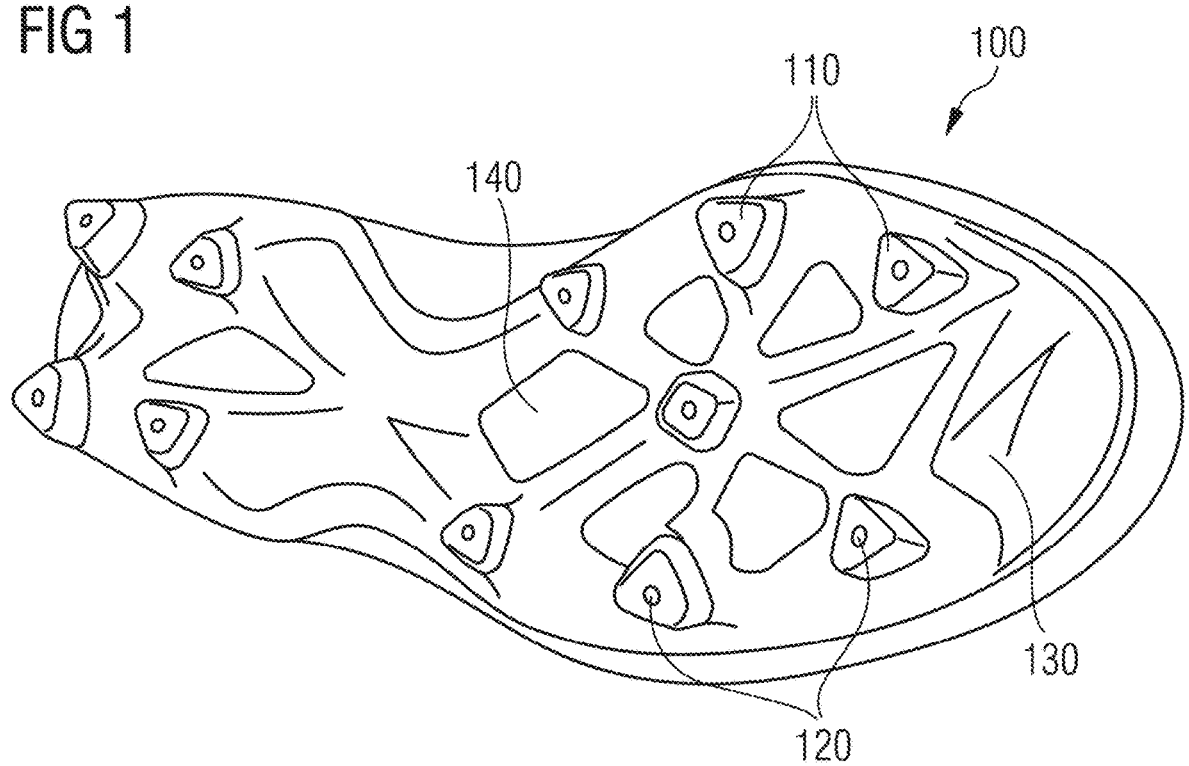
FIG. 1 is a perspective view of a sole with profile elements, through which a second sole element was injected, according to certain embodiments of the present invention.

The object of this invention is, at least in part, achieved by a method for manufacturing a sole, a sole, a method for fabricating a shoe, and a shoe.

According to some embodiments, a method for manufacturing a sole, in particular, a sole for a sports shoe, comprises a step of providing at least one first sole element and at least one second sole element, and a step of injecting the least one second sole element, for example, by injection molding, spraying, additive manufacturing, 3-D printing, or any other suitable method, through the at least one first sole element.

Thus, a sole having several individual sole elements may be provided with a durable connection between the individual sole elements. By injecting at least one part of the sole through at least one other part of the sole, a form-fitting connection between the individual sole elements may be achieved. After the injection, at least a part of the material of the second sole element may remain in the first sole element, such that a complete, or at least a partial, form-fitting connection is provided between the first sole element and the second sole element. As a result, lateral forces may be absorbed. By injecting the second sole element through the first sole element, lateral forces between the first sole element and the second sole element may be absorbed, in at least in three, or in all four lateral spatial directions. In some embodiments, a full sole layer, for example, an outsole, may be injected through the at least one first sole element. At least one sole element may also extend to, and/or into, an upper portion of a shoe.

The lifetime of a sole, after which the first and/or the second sole element disengage from the sole, may be substantially improved by the described embodiments. The described embodiments allow using different materials for the individual sole elements. Due to the at least partial form-fitting connection, the sole has essentially the same lifetime as that of soles made from a single material.

The at least one sole element may have a profile element. For example, the first sole element may be adapted as a profile element. By injecting the second sole element through the profile element, an at least partial form-fitting connection between the profile element and the second sole element may be achieved, which enables the profile element to resist the large forces that arise when the sole contacts the ground. At the same time, tailored materials may be used for the profile element and the second sole element, which may, for example, form at least a part of an outsole.

The profile element may have at least one stud. For example, the profile element may be adapted as a stud. Large lateral forces, which, studs of a soccer shoe are exposed to during fast turns, for example, may be safely absorbed by the at least partial form-fitting connection between the profile element and the second sole element. Some embodiments of the present method also allow providing soles for studded shoes or cleated shoes, such as soccer shoes, which are stable even under outdoor conditions, such as varying temperatures and wet conditions. In other embodiments, the profile element may be provided as a pin, or a nub, etc.

The first sole element may have an aperture. The aperture may be a tunnel-like through hole of the first sole element. The through hole may extend from an upper side of the profile element to a lower side of the profile element. After injecting the second sole element through the first sole element, this aperture may, at least in part, be filled by the material of the second sole element, such that a particularly stable connection between the profile element and the second sole element is formed.

The second sole element may comprise at least one of the following synthetic materials: polyamide, polyether, blockamide, polyvinylchloride, polyurethane, thermoplastic polyurethane (TPU). These materials are particularly suited to, for example, provide an outsole with desired properties. Also, additional injected elements, which are described herein, may comprise at least one of said synthetic materials.

The first sole element may be provided at a flexible sock element. For example, the first sole element may be injected onto the flexible sock element, or the first sole element may be clipped onto the flexible sock element. Using TPU as a material for at least one sole element, for example, the first and/or the second sole element, has the benefit that the sole element may be transparent. Thus, even after the injection of a relatively thick layer of TPU for at least one sole element, the flexible sock element remains visible from outside. Using polyamide for at least one sole element, up to a certain layer thickness, also has the benefit that the sole element may be transparent or milky.

Injecting the second sole element through the first sole element may provide a connection between the second sole element and the flexible sock element. In addition, the connection between the first sole element and the flexible sock element may be improved. Thus, for example, a complete sole may be applied onto the flexible sole element. The flexible sock element may be configured as a sock, which covers the foot, and may extend, for example, to the ankle or beyond the ankle. The described method allows the provision of a shoe with a stable multi-part sole, wherein the sole elements are injected onto the flexible sock element. Thus, an additional attachment of a separately manufactured sole to a shoe is not necessary. The described method may, in addition, be fully automated. For example, the flexible sock element may be provided in an automated manufacturing process. The at least one sole element may be provided at the flexible sock element in an additional manufacturing step.

The flexible sock element may comprise a textile. For example, the flexible sock element may comprise a knitted fabric. A knitted fabric allows cost effective automated manufacturing and may be provided with various material properties. For example, a round-knitted and/or flat-knitted and/or a tubular-knitted fabric may be used. The flexible sock element may be fabricated as a single piece, or it may be composed of several elements, for example, a ground-engaging portion and an upper portion, which may be stitched or glued, for example.

The flexible sock element may comprise at least one of the following materials: polyamide, polyester, cotton, leather, polyurethane. For example, yarns and/or fibers consisting of polyamide, polyester, polyurethane and/or cotton may be used. Leather, for example, genuine leather and/or synthetic leather, may also be used. The flexible sock element may be fabricated from a single material. Optionally, the flexible sock element may be printed, coated, additionally functionalized and/or optically designed by other mechanisms. Alternatively, or additionally, the properties of the flexible sock element may be optimized, for example, by combining different materials in different regions.

The second sole element may form an outsole element. According to some embodiments, the outsole may be fabricated in a single step, and may be permanently connected to other sole elements, for example, profile elements. The connection between the outsole and the other sole elements withstands the high loads, which occur at an outsole. The method may have an additional step of injecting a reinforcing element onto the flexible sock element. In addition to fabricating the at least one first and second sole elements, in an additional manufacturing step, the flexible sock element may be reinforced as desired by the reinforcing element. For example, a tensile strength and/or a bending resistance of the flexible sock element may be locally increased by the reinforcing element. A shoe with a stable multi-part sole may thus be manufactured in a fully automated manner. For example, the reinforcing element may be injected into an upper portion of the flexible sock element, such that the flexible sock element is provided with predetermined properties of a shoe upper. The reinforcing element may have a heel cap, and/or the reinforcing element may be injected such that it forms a heel cap.

The provision of the first sole element at the flexible sock element may include injecting or clipping the first sole element onto the reinforcing element. Injecting the second sole element through the first sole element may provide a connection of the second sole element to the reinforcing element. In addition, the connection between the first sole element and the reinforcing element may be improved.

The at least one second sole element may be injected such that it is arranged, at least in part, between the reinforcing element and the first sole element. This arrangement may achieve a high mechanical stability of the multi-part sole and the reinforcing element.

The reinforcing element may be injected such that it extends to and/or onto an upper region of the flexible sock element. Thus, the upper region of the flexible sock element may be provided with desired properties of a shoe upper. To this end, a softer, more stretchable and/or more flexible material may be used, which is desirable for a sole. The reinforcing element may comprise at least one through hole, through which the material of a first and/or a second sole element may penetrate. The penetration may contribute to achieving an improved connection between the reinforcing element and the flexible sock element. In general, harder materials allow a better connection to the flexible sock element. The material of the reinforcing element may also be arranged at a sole portion of the flexible sock element. In other embodiments, the reinforcing element may be arranged only at the upper region of the flexible sock element.

The second sole element may be harder, more abrasion resistant, and/or stiffer than the reinforcing element. Thus, in a sole region, a higher hardness, abrasion resistance and/or stiffness may be provided than in an upper region.

The reinforcing element may have a Shore-A hardness of approximately 25 to 75, in particular 50 to 70, 35 to 55 or 40 to 50. Thus, the reinforcing element may, for example, sufficiently reinforce the upper region, but, at the same time, provide good wearing comfort. Moreover, material of this hardness range may still be connected in a sufficiently stable manner by injecting, for example, at the flexible sock element.

The first sole element may have a Shore-A hardness of approximately 55 to 95, in particular 60 to 95 or 85 to 95. This hardness range is also well suited for profile elements, for example.

The second sole element may have a Shore-A hardness of approximately 60 to 100, in particular 70 to 90, or 75 to 85. This hardness range is well suited for an outsole, and this hardness range enables a secure connection of the second sole element to a first sole element and/or a reinforcing element.

In some embodiments, expanded TPU is applied as a sole element on the flexible sock element, in particular, for manufacturing a running shoe or similar types of shoes. Applying a sole element of expanded TPU may be carried out in a separate step, for example, after injecting a reinforcing element on the flexible sock element. Such a sole element may, for example, form a sole layer. A connection between the sole element of expanded TPU and a reinforcing element and/or other sole elements may be achieved by suitable connecting techniques, such as infra-red welding, chemical connecting techniques or any other suitable connecting technique.

In some embodiments, a sole, in particular, a sole for a sport shoe, is provided. The sole comprises at least one first sole element and at least one second sole element. The at least one second sole element is injected through the at least one first sole element.

The sole may be manufactured according to any one of the described methods.

According to certain embodiments, a shoe is provided with any of the soles described above.

In some embodiments, a method for manufacturing a shoe, in particular, a sports shoe, comprises a step of providing of a flexible sock element, and a step of injecting at least one sole element onto the flexible sock element, such that the at least one sole element has a stiffening element below the arch of the foot. The stiffening element may have a specific geometry, for example, it may be designed in a rib-like manner.

The sturdiness of a sole element, which has been injected onto a flexible sock element, may be improved by injecting the sole element such that it has a stiffening element below the arch of the foot. The arrangement of the stiffening element below the arch of the foot, may provide a sole element that is sufficiently resistant to bending and torsion, which may safely prevent breaking of the arch of the foot or twisting of the ankle. The stiffening element is of particular importance if a sole element comprising TPU is injected. Also, when injecting a sole element made of polyamide, a stiffening element is of relevance and, in particular, enables sole elements of low thickness to be applied while still providing a sufficiently stable sole. Sole elements having a low thickness may be desirable because such sole elements may be more transparent.

The stiffening element may be aligned along a longitudinal direction of the shoe. This arrangement of the stiffening element provides support to the arch of the foot along its full length. Moreover, this arrangement of the stiffening element may prevent twisting of the ankle despite fast and powerful lateral movements, which arise in sports shoes.

The stiffening element may extend from a region below the heel to a region below the metatarsals. Such an elongate stiffening element ensures a sufficient stability in the entire rear region of the shoe from the heel to the metatarsals, while allowing increased flexibility in the toe region. The stiffening element may also extend along a central region of the foot, below the arch of the foot.

The sole element may be injected such that it extends to and/or onto an upper region of the flexible sock element. When the sole element at least partially encompasses the flexible sock element, an improved connection between the flexible sock element and the sole element may be achieved. In this manner, an upper region of the flexible sock element may be provided with desired properties. The sole element may have a thickness in the upper region of the flexible sock element that is lower than a thickness in a sole portion of the flexible sock element.

The flexible sock element may be provided with a protrusion and/or an indentation. The sole element may be injected, such that it at least partially encompasses the protrusion and/or such that it at least partially penetrates into the indentation, such that a form-fitting connection is provided. A form-fitting connection is created by areas of the protrusion and/or of the indentation at least partially lying against the sole element. The stiffening element may also be provided in this manner. In addition, lateral forces may be absorbed by the at least partial form fitting connection, such that a particularly stable connection between the sole element and the flexible sock element is created. The longevity of the sole may thus be significantly increased.

The method may further comprise a step of applying the flexible sock element onto a fixation element. The fixation element may be arranged to provide the protrusion and/or the indentation of the flexible sock element. For example, the flexible sock element may be pulled over the fixation element before the sole element is injected. The fixation element may have an elevation, which creates a protrusion at the flexible sock element placed thereon. The fixation element may also have a recess, which creates an indentation in the flexible sock element. A pressure and/or mechanical fixation mechanism, such as a hook, may hold a region of the flexible sock element in the recess, such that an indentation is created in the flexible sock element. In other embodiments, the flexible sock element may be pushed into the recess of the pressure and/or mechanical fixation mechanism by the injected material of the sole element. In some embodiments, the fixation mechanism includes a mechanism for ensuring the correct positioning of the flexible sock element.

The flexible sock element may be provided such that the protrusion and/or the indentation of the flexible sock element is, at least in part, pre-formed. For example, the flexible sock element may be provided in a folded manner and/or in a plurality of layers to provide a protrusion and/or an indentation. Moreover, a protrusion and/or an indentation may be achieved by a combination of flat knitting and circular knitting. By using a fixation mechanism having an elevation and/or an indentation, it may be insured that the protrusion and/or the indentation in the flexible sock element is correctly arranged during the injection of the sole element. Moreover, the elevation and/or recess of the fixation mechanism may further form the protrusion and/or the indentation of the flexible sock element, for example, by stretching the material of the flexible sock element.

The described method may also comprise a step of providing a sole plate element at the flexible sock element for forming the protrusion and/or the indentation of the flexible sock element. The sole plate element may, for example, be inserted into the flexible sock element, or may be placed at an outer side of the flexible sock element. The sole plate element may also be put on the fixation mechanism, and, subsequently, the flexible sock element may be pulled over the fixation mechanism and the sole plate element. The sole plate element may have an elevation and/or a recess to provide a corresponding protrusion and/or a corresponding indentation at the flexible sock element.

The method may further comprise a step of providing a sole plate element with an elevation and/or a recess at the flexible sock element, wherein the sole element is injected, such that it, at least in part, encompasses the elevation and/or penetrates into the recess to provide a form-fitting connection. Thus, a safe connection between the sole plate element and the sole element may be ensured. Also, a stiffening element may be provided in this manner. The sole plate element may, for example, be glued and/or stitched to the flexible sock element. According to certain embodiments, the sole element may be injected onto the flexible sock element such that the sole plate element is fixed at the flexible sock element.

The sole element may be configured as a reinforcing element for the flexible sock element, and the method may further comprise a step of injecting an outsole element onto the reinforcing element. The reinforcing element may extend to and/or onto an upper region of the flexible sock element. In an upper region, a thickness of the reinforcing element may be reduced compared to a thickness of the reinforcing element in the sole region. By using a two-step injection of a reinforcing element and an outsole element, the properties for the upper region and the sole region may be tailored, as needed, independently from each other.

The sole element may also be configured as an outsole element. Moreover, a reinforcing element may be injected onto the flexible sock element prior to the injection of the outsole element. The reinforcing element may be configured such that it has a constant thickness in the sole region. The reinforcing element may have at least one through hole, for example, in the sole region around an indentation and/or a protrusion of the flexible sock element.

The outsole element may be harder, more abrasion resistant, and/or stiffer than the reinforcing element. The properties of the outsole and/or of the upper region of the shoe may thus be tailored as needed.

The reinforcing element may comprise a Shore-A hardness of approximately 25 to 65, in particular 35 to 55 or 40 to 50.

The reinforcing element may have at least one through hole. This may help achieve an improved connection between the reinforcing element, the optional outsole element and the flexible sock element.

The outsole element may comprise a Shore-A hardness of approximately 60 to 100, in particular 70 to 90 or 75 to 85.

According to some embodiments, a shoe, in particular, a sports shoe, comprises a flexible sock element and at least one sole element, which is injected onto the flexible sock element and has a stiffening element below the arch of the foot.

The shoe may be manufactured according to any of the methods described above.

The flexible sock element, the sole element and the reinforcing element, may have additional properties.

According to a certain embodiments, an apparatus for manufacturing a shoe is provided. The apparatus has a fixation element for a flexible sock element and a mechanism for injection molding arranged around the fixation element, which has a mold for injection molding comprising at least three parts, such as a mold in which the cavity for the material for injection molding is formed by three or more parts of the mold when injection molding.

A three-part design (a design having three parts) enables molds for injection molding to be provided in a more versatile manner because individual parts of the three-part mold may be exchanged, as needed. For example, a flexible sock element may be provided with a plurality of injected elements without requiring a complete new mold for injection molding for each injected element. The flexible sock element on the fixation element may, for example, be fixed by two parts of the mechanism for injection molding. For example, two parts of the mechanism for injection molding may be arranged movably, with respect to each other, such that the flexible sock element on the fixation element may be clamped within the mechanism for injection molding by these two parts. Thus, the third part of the mechanism for injection molding may be quickly exchanged without having to position and fix the flexible sock element again. For example, the third part may be designated for the sole portion of the flexible sock element, such that the sole portion of the flexible sock element may be provided with different elements by exchanging only this third part.

The mechanism for injection molding may have a first mold part, which encompasses the fixation element at an area that is designated for a sole of the shoe, in order to form a first mold for injection molding having at least three parts. Thus, for example, a sole element with a predetermined shape may be injected onto the flexible sock element using the first mold part. The at least two additional parts of the mechanism for injection molding may, for example, only ensure that an upper region of the flexible sock element remains free from injected material during injection of the sole element. Alternatively, the additional parts of the mechanism for injection molding may be configured to shape the upper region such that the sole element may, for example, extend to and/or onto the upper region. The first mold part may also ensure that, at least in a partial region of the sole region, no material is injected. The at least two additional parts of the mechanism for injection molding may also be adapted for shaping, for example, a reinforcing element, which is not arranged in the sole portion of the flexible sock element. The first mold part may be designed to be multi-part (to have a plurality of parts).

The mechanism for injection molding may have a second mold part, which encompasses the fixation element at an area that is designated for the sole of the shoe, instead of the first mold part, in order to form a second mold for injection molding that has at least three parts. Thus, for example, a further sole element and/or a reinforcing element may be injected using the second mold part. The second mold part may ensure that when injecting a reinforcing element, for example, at least a part of the sole portion of the flexible sock element remains free from injected material. The second mold part may, alternatively, or additionally, be designed to shape the sole portion.

The mechanism for injection molding may have at least two lateral mold parts which are movable relative to each other, and laterally encompass the fixation element. The lateral mold parts may determine the shape of sole and/or reinforcing elements on the upper region of the flexible sock element, for example. The at least two lateral mold parts may fix the flexible sock element at the fixation element such that the position of the flexible sock element is fixed in all three spatial directions.

The two lateral mold parts may be arranged in a movable manner relative to the first mold part and/or to the second mold part. Thus, the lateral mold parts may be joined with the first mold part and/or second mold part to form a first and/or second mold for injection molding, respectively, for example, in an automated manner.

The apparatus may also have a device for removing the fixation element from the mechanism for injection molding. Thus, the fixation element and the flexible sock element may be removed from the mechanism for injection molding safely and without damaging the mold for injection molding. Also, a contamination of the mold for injection molding may thus be prevented.

The fixation element for the flexible sock element may be configured to be multi-part. Thus, the fixation element may, for example, be adapted to flexible sock elements corresponding to different shoe sizes. Also, arranging the flexible sock element around the fixation element may be facilitated.

The described apparatus may be configured such that one of the described methods may be carried out. In particular, the apparatus may be configured such that the described methods may be carried out in a fully automated manner.

According to some embodiments, a method for manufacturing a shoe, in particular, a sports shoe, comprises a step of providing a synthetic upper material and a step of providing at least one profile element. The at least one profile element is provided at the synthetic upper material such that a sole element, for example an outsole element or an outsole, may be injected between the synthetic upper material and the at least one profile element. The injecting of the sole element may be carried out such that the sole element adheres to both of the synthetic upper material and the at least one profile element at the same time. Thus, the at least one profile element may be connected with the synthetic upper material by the injecting of the sole element, without requiring a separate manufacturing step. For example, by directly injecting an outsole between the synthetic upper material and the studs, the studs are durably connected with the outsole, and the outsole is durably connected with the synthetic upper material. Thus, the need for an additional fabrication step for manufacturing the shoe is eliminated because connection devices such as adhesives, are not needed. A benefit of a shoe manufactured according to the described methods is that the shoe will have a particularly low weight. Moreover, the described methods enable automation of the manufacturing process.

The injecting may, for example, be carried out by injection molding. The injected material may, for example, comprise TPU. The synthetic upper material may be placed on a fixation material. A production line may have a plurality of such fixation elements. Moreover, a mechanism for receiving profile elements, in particular studs, may be provided. At least one profile element, such as studs or islands of studs, may be inserted in the at least one mechanism for receiving profile elements. The profile elements may be pre-manufactured from TPU, such as by a suitable injection molding method. The profile elements may have protrusions or indentations, which the injection molding material may encompass, or, in which the injection molding material may extend into, in order to achieve an additional form-fitting connection between the injected material and the at least one profile element. The same generally applies to the synthetic upper material. Protrusions and/or indentations may also be provided to achieve an additionally stabilizing form-fitting connection.

After the insertion of the synthetic upper material into the fixation element and the insertion of the at least one profile element into the at least one mechanism for receiving profile elements, the fixation element, together with the synthetic upper material, may be moved towards the at least one profile element, until only a small gap remains between the synthetic upper material and at least one profile element. The size of the gap may be adapted to the thickness of the sole element to be injected. A sole element, such as an outsole, for example made from TPU, may be injected between the synthetic upper material and the at least one profile element.

In other embodiments, instead of the synthetic upper material, a different material may be used, and generally, a flexible sock element may be provided and used as explained above with reference to the flexible upper material. Moreover, some embodiments with a synthetic upper material and a flexible sock element, respectively, may be combined with aspects, which were described in the context of other embodiments.

According to certain embodiments, a method for manufacturing a shoe, in particular, a sport shoe, comprises a step of providing at least one first sole element of the shoe and at least one second sole element of the shoe is injected through the at least one first sole element of the shoe. The aspects described herein may also be used for fabricating elements of a shoe, which do not necessarily need to be arranged at the sole.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Possible embodiments of the present invention will be described in the following detailed description primarily with reference to soles for sport shoes and with reference to sport shoes, respectively. However, it is emphasized that the present invention is not limited to these embodiments. Rather, it may also be applied to other types of soles or shoes, respectively.

Moreover, it is noted that only individual embodiments of the invention may be further explained in the following. The person skilled in the art readily recognizes that the implementation details described with reference to these specific embodiments may be modified or combined differently with each other within the scope of the invention, and that individual features may also be omitted as far as these seem to be optional. In order to avoid repetitions, in particular reference is made to the explanations in the above paragraphs, which also apply to the following detailed description.

FIG. 1 shows a shoe with a sole 100, according to certain embodiments. The sole 100 has a plurality of first sole elements in the form of profile elements, such as studs 110. Each profile element 110 may comprise an opening 120. The profile elements 110 optionally are arranged on an element 140, which may be manufactured in a single piece together with studs 110, for example by injection or additive manufacturing. Element 140 may, however, also be fabricated separately and/or from a different material. Element 140 may, for example, be adapted as a reinforcing element made from TPU and/or may form a mid-sole element. Element 140 may be adapted to be multi-part.

Through the openings 120 of the profile elements 110, a second sole element in the form of an outsole element 130 is injected, and may be, for example, made from polyamide. Outsole element 130 is injected through all openings 120. In other embodiments, an outsole element 130 and/or other sole elements may only be injected through a subset of profile elements 110 and/or subset of openings 120. In other embodiments, only some of the profile elements 110 may comprise an opening 120 and/or some of the profile elements 110 may comprise more than one opening 120.

Outsole element 130 has a plurality of through holes in the forefoot region and one through hole in the heel region, through which element 140 may be seen. In other embodiments, other through holes may be provided. Outsole element 130 may also be adapted as a continuous outsole. Outsole element 130 may be a 3-dimensional structure. For example, outsole element 130 may have a higher thickness below the profile elements 110 than between the profile elements 110, as may be seen in the heel region in FIG. 1.

The partial arrangement of the material of outsole 130 in the openings 120 of profile elements 110 allows, as explained above, a particularly stable mechanical connection between the outsole 130 and the profile elements 110. In addition, the at least partial sandwich-like arrangement of the material of outsole element 130 between profile elements 110 and element 140 contributes to the stability of the sole 100. In some embodiments, sole 100 may be fabricated separately. In other embodiments, sole 100 may be fabricated directly on a shoe upper or a flexible sock element. It is emphasized that element 140 is optional. Profile elements 110 may be provided at a lower side of a shoe upper or a flexible sock element. Outsole element 130 may be injected through at least one of profile elements 110 such that sole 100 is directly provided at the lower side and such that a separate connection of sole 100 to the lower side is not necessary. In other embodiments, instead of outsole element 130, a different sole element is injected through at least one of profile elements 110.

Figure 2:
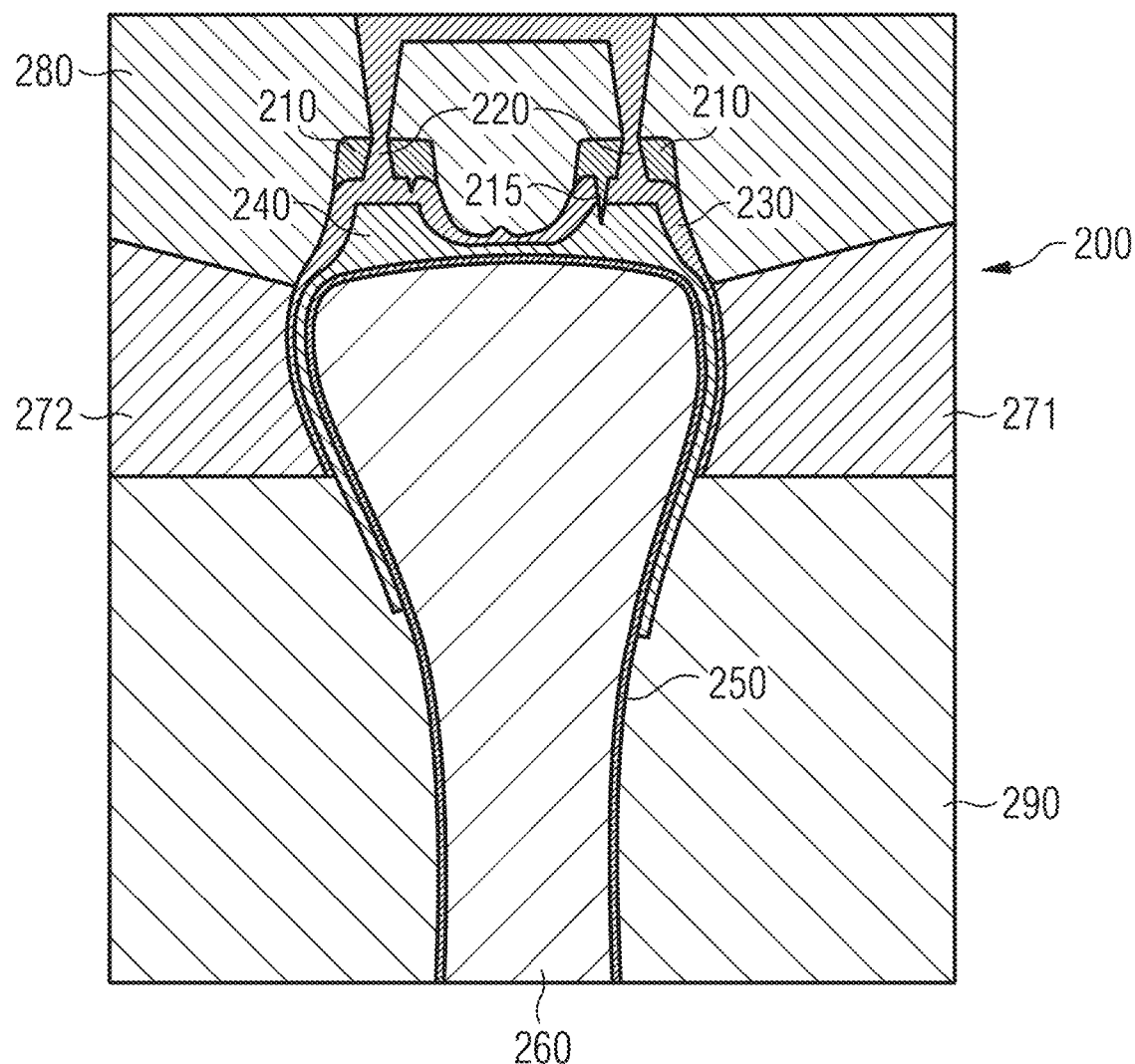
FIG. 2 is a schematic diagram illustrating the injection of a second sole element through profile elements.

FIG. 2 shows a schematic illustration of the injection of a second sole element 230 through first sole elements, which are adapted as studs 210, for fabricating a shoe 200. A flexible sock element 250 is arranged above a fixation element 260. A reinforcing element 240 is arranged on the flexible sock element 250. The reinforcing element 240 may, for example, be injected onto flexible sock element 250 in a first fabrication step. The reinforcing element 240 extends along the sole portion of the flexible sock element 250 and to and/or onto the upper region thereof. The reinforcing element 240 may form a heel cap. In some embodiments, the reinforcing element 240 may fully extend around flexible sock element 250. The reinforcing element 240 may achieve, for example, a desired stiffening of the upper region. A thickness of the reinforcing element 240 may be lower in the upper region compared to a thickness in the sole region. Moreover, it may be constant in the upper region. In the sole region, the reinforcing element may be thickened in regions in which first sole elements, for example studs 210, are provided. Thus, the first sole elements may be pre-formed by the reinforcing element 240.

First sole elements, for example studs 210, are provided on the reinforcing element 240. Studs 210 may, for example, be injected onto the reinforcing element 240 in an additional fabrication step. Alternatively, studs 210 may be clipped onto reinforcing element 240. To this end, a corresponding notch may be provided in the reinforcing element 240. It is not necessary to stably attach studs 210 at this point. For example, it is sufficient, if the studs 210 are connected via a mandrel 215, or any other thin element, to the reinforcing element 240. The mandrel 215 may serve as a spacer between the studs 210 and the reinforcing element 240. It is also possible to arrange only the first sole elements, for example the studs 210, at the reinforcing element 240 or, in case the optional reinforcing element 240 is not present, at the flexible sock element 250, without realizing a connection. For example, the first sole elements, such as studs 210, may be held only at, or close to, the reinforcing element 240 and/or at the flexible sock element 250.

The fixation element 260, the flexible sock element 250 arranged thereupon with its reinforcing element 240, and the studs 210 are fixed within a mechanism for injection molding having a mold for injection molding. The mold for injection molding has three parts. It comprises two lateral mold parts 271, 272, as well as a top mold part 280. Optionally, the mold for injection molding has a bottom part 290. The top mold part 280 is adapted such that the material for the second sole element 230 may flow to the openings 220 of studs 210 via at least one channel. The channels may be adapted such that the material streams inwards in the direction of the openings 220 in a way to avoid turbulences during influx. By arranging the material of the second sole element 230 at least partially within studs 210, and between studs 210 and reinforcing element 230, and flexible sock element 250, respectively, a stable connection may be provided, as explained above.

In a central region of the sole, the second sole element 230 may have a stiffening element, which is arranged below the arch of the foot. The stiffening element may be adapted such that it tapers in the region of the heel and in the region of the metatarsals and transitions into a flat region of the second sole element 230. FIG. 2 shows a cross section of such a tapered stiffening element. Full views of possible stiffening elements are shown in FIGS. 3 and 4.

The lateral mold parts 271, 272 and top mold part 280 shape the second sole element 230. The second sole element 230 may be adapted as an outsole element. The outsole element, according to FIG. 2, extends to and/or into the upper region of flexible sock element 250. This extension allows an improved connection of the outsole element to the reinforcing element 240 or the flexible sock element 250, respectively. This extensions also allows providing desired properties to a region around the sole region. For example, the outsole element may comprise a material, which has a greater hardness, a greater abrasion resistance and/or a greater stiffness than the material of reinforcing element 240. The optional bottom part 290 of the mechanism for injection molding may determine a boundary surface of the outsole element 230. Alternatively, or additionally, the boundary surface may also be provided by an edge of the lateral mold parts 271, 272. In other embodiments, second sole element 230 may be adapted as a different element, for example, an intermediate sole element or a midsole element.

Figure 3:
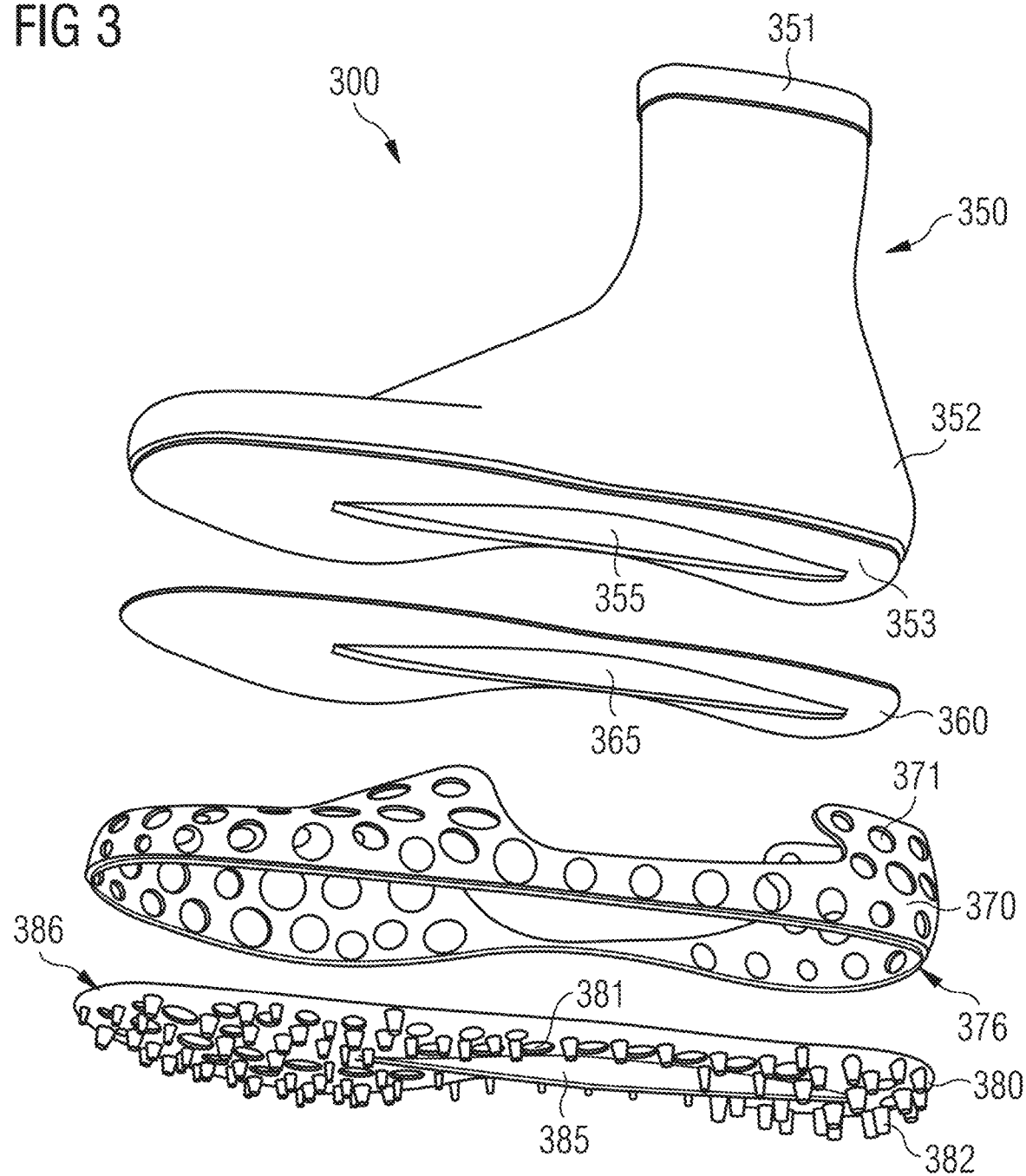
FIG. 3 is a side elevation view of a shoe showing a flexible sock element and an injected sole element having a stiffening element below the arch of the foot, according to certain embodiments of the present invention.

FIG. 3 shows a shoe 300, according to certain embodiments, with a flexible sock element 350 adapted as a sock. The flexible sock element 350 has an upper region 352 and a sole portion 353. These two portions may each be fabricated to be one-piece (e.g. monolithic). They may be stitched to each other or glued to each other. In other embodiments, different and/or further portions may be provided. Flexible sock element 350 may also be fabricated to be one-piece, and may, for example, be knitted. Flexible sock element 350 optionally has a seam 351. At the lower side of sole portion 353, a protrusion 355 may be provided. The protrusion 355 may, for example, be fabricated by circular knitting in a one-piece sole portion 353. Protrusion 355 may also be fabricated separately and connected to flexible sock element 350, for example, by stitching. The flexible sock element 350 may, for example, be impregnated and/or be otherwise optically and/or functionally modified by printing, or coating etc. In other embodiments, flexible sock element 350 may be adapted as an incomplete sock and cover only a part of the surface of the foot.

Shoe 300 optionally has a sole plate 360, which may for example be formed from polyamide or TPU. The sole plate may, for example, be fabricated by a suitable injection molding method or by a 3-D printing method.

In some embodiments, sole plate 360 is adapted to be arranged at the lower side of sole portion 353. For example, sole plate 360 may be glued and/or stitched to the lower side of sole portion 353. Sole plate 360 has an elevation 365, which is adapted such that protrusion 355 of flexible sock element 350 may be arranged therein. Sole plate 360 may, in other embodiments, be provided as a sole plate element, which covers only a partial region of the lower side of sole portion 353, for example, a forefoot region, such that, if needed, a pressure of the studs may be distributed in a better way to the forefoot.

According to other embodiments, sole plate 360 is releasably attached at a sole portion of a fixation element, as described above, such as a last. For example, soluble adhesives or pins may be used for attaching. To connect with sole portion 353 of flexible sock element 350, sole plate 360 may have a hot-melt coating at its outer side facing away from the fixation element. After releasably attaching sole plate 360 onto the fixation element, flexible sock element 350 is pulled over the fixation element and sole plate 360. Therein, sole plate 360 is arranged inside sole portion 353 of flexible sock element 350. When subsequently injecting at least one of the sole elements onto flexible sock element 350, sole plate 360 may be permanently connected with flexible sock element 350 via the hot-melt coating. If needed, a removable insole may be arranged above the sole plate 360 inside flexible sock element 350.

In some embodiments, sole plate 360 is exchangeably inserted into flexible sock element 350. The insertion of sole plate 360 is carried out after injecting sole elements on an outer side of the flexible sock element. The sole plate may have an additional layer of damping material.

Shoe 300 may have a reinforcing element 370. The reinforcing element 370 may be injected onto flexible sock element 350 and optionally onto sole plate 360. The reinforcing element 370 may enable the upper region 352 of the flexible sock element 350 to be provided with desired mechanical properties. For example, in a lower region of the upper region of the flexible sock element 350 (or around it), an increased stiffness and tensile strength may be provided. This region may extend further upwards along the upper region into the heel region and into the instep region than it extends into a midfoot region because an increased sturdiness may be desirable in the heel and instep regions. The reinforcing element 370 may ensure that shoe 300 provides sufficient traction and prevents slipping of the foot within the shoe. For example, reinforcing element 370 may be arranged across the entire instep region of flexible sock element 350. In other embodiments, reinforcing element 370 is only arranged in a region of the forefoot adjacent to the sole. Reinforcing element 370 may include through holes 371, which may selectively control the local material density. Thus, varying degrees of stiffness and tensile strength may be achieved. Moreover, reinforcing element 370 may also provide increased friction when contacting a ball, such as a soccer ball. If reinforcing element 370 also extends onto sole plate 360, the latter may be fixed to shoe 300 by the reinforcing element 370, without requiring gluing and/or stitching of sole plate 360. Reinforcing element 370 may, independently of the optional sole plate 360, extend onto sole portion 353 of flexible sole element 350.

Shoe 300 has a sole element 380. Sole element 380 may be adapted as an outsole element. Sole element 380 may be injected onto sole portion 353 of flexible sock element 350, onto an optional sole plate element 360 arranged thereupon, and optionally onto reinforcing element 370. For example, sole element 380 may overlap reinforcing element 370 in a region 386 of sole element 380 or in a region 376 of reinforcing element 370, respectively, which are arranged along the edge of sole portion 353. In other embodiments, different overlapping regions may be provided. Sole element 380 has a stiffening element 385. Stiffening element 385 may ensure a sufficient stability of the sole of shoe 300. Sole element 380 may be injected such that it at least partially encompasses protrusion 355 and/or optional elevation 365, thus, providing stiffening element 385. Additionally, a form-fitting connection between sole element 380 and flexible sock element 350 and/or optional sole plate element 360 may thus be provided.

Sole element 380 may have through holes 381. In other embodiments, sole element 380 may be arranged continuously and/or fully cover sole portion 353. Sole element 380 optionally comprises profile elements 382, which may be adapted as nubs. In other embodiments, studs may also be provided. Sole element 380 may overlap reinforcing element 370.

Figure 4A:
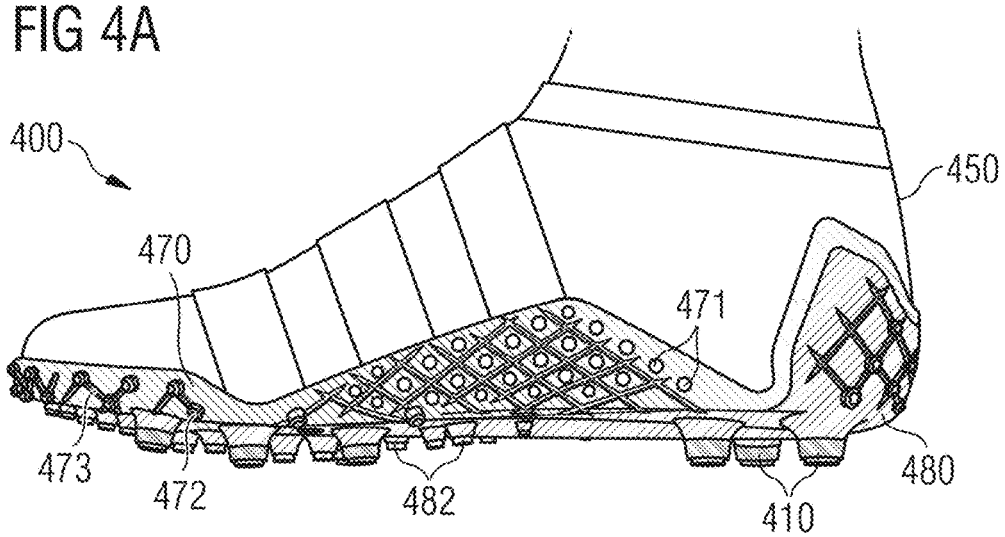
FIGS. 4A-C are perspective views of a shoe with a flexible sock element and an injected sole element having a stiffening element below the arch of the foot and studs, according to certain embodiments of the present invention.
Figure 4B:
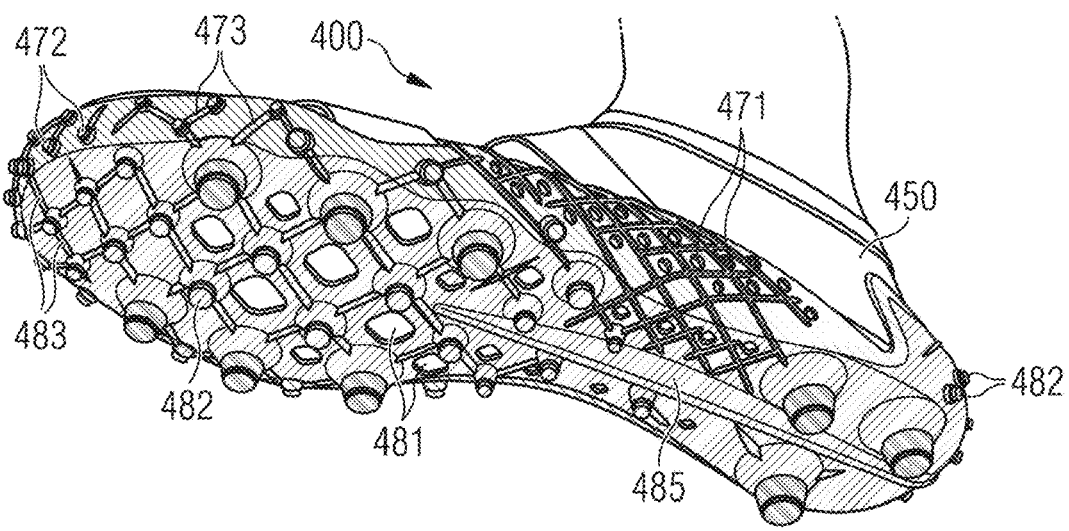

FIGS. 4A-B show some embodiments of a shoe 400 with a flexible sock element 450. FIG. 4A shows a medial view of shoe 400. Flexible sock element 450 may be adapted as a sock with a seam around an ankle region. Flexible sock element 450 may be optically designed or functionalized, as desired.

An injected reinforcing element 470 may be placed at the flexible sock element 450. Reinforcing element 470 may at least partially be arranged at a sole portion of flexible sock element 450. It may fully extend around a sole portion of flexible sock element 450. Alternatively, reinforcing element 470 may be arranged only at a region along an edge of the sole portion. Reinforcing element 470 may also extend onto an upper region of flexible sock element 450. Reinforcing element 470 may have a heel region. Reinforcing element 470 may optionally have a plurality of through holes 471 and/or nubs 472 and/or grooves 473.

Moreover, an injected sole element 480 may be placed onto flexible sock element 450. Sole element 480 may be injected after injection of reinforcing element 470, and sole element 480 may overlap with reinforcing element 470. Sole element 480 may be arranged in a sole portion of flexible sock element 450. Sole element 480 may, in addition, extend to and/or into the upper region of the sock element and may have a heel region. The heel region of sole element 480 may, fully or partially, overlap the heel region of reinforcing element 470. Moreover, sole element 480 may fully or partially overlap reinforcing element 470 in a region of the sole portion of flexible sock element 450, for example, in a region along the edge of the sole portion. Sole element 480 may have profile elements, such as nubs 482 and/or studs, etc.

Shoe 400 may have profile elements, such as studs 410. Studs 410 may be injected onto the shoe. For example, studs 410 may be injected onto sole element 480. Optionally, studs 410 may also be injected onto reinforcing element 470 and/or flexible sock element 450. Sole element 480 may be injected through studs 410. Alternatively, it is also possible to insert the studs 410 into a mold and to inject the sole element 480 and/or the reinforcing element 470 between the studs 410 and the flexible sock element 450.

FIG. 4B shows a medial bottom view of shoe 400. As shown in FIG. 4B, the shoe 400 may have through holes 481, nubs 482 and grooves 483 on the sole element 480 in addition to the through holes 471, nubs 472 and grooves 473 of the reinforcing element 470. Moreover, the sole element 480 has a stiffening element 485, which is arranged below the arch of the foot. Stiffening element 485 extends from below a rear region of the heel until below a region of the metatarsals. The stiffening element 485 is aligned along a longitudinal direction of the shoe 400. The through holes 481 and 471 of the sole element 480 and/or of the reinforcing element 470, respectively, may influence the venting properties of shoe 400. In particular, they may be adjusted to each other, such that a waterproof shoe 400 is provided. In some embodiments, sole element 480 and/or reinforcing element 470 are provided without through holes 481 and 471, respectively. Optionally, shoe 400 may also have at least one sole plate element, which is provided within the flexible sock element 450 and/or outside at the lower side of the sole portion of the flexible sock element 450.

Figure 4C:
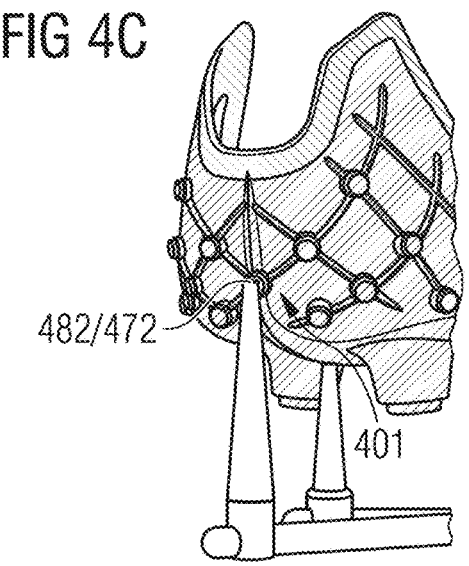

Optionally, local injection ports 401 are provided in the mold for injection molding for injecting the sole element 480 and/or the reinforcing element 470. Local injection ports 401 may be provided at the positions of nubs 482 and 472, respectively, as shown in FIG. 4C. Thus, the injection occurs into larger cavities, such that turbulences in the injection stream may be reduced, and a more even injection as well as improved injection quality are enabled.

FIG. 5 shows a method for fabricating a shoe with a flexible sock element and a sole with profile elements, having steps 1-11. The person skilled in the art readily recognizes that the individual steps are only exemplary and that individual steps may be omitted and/or the steps may be carried out in different orders. Step 1 shows a step of printing onto a flexible starting material 515 using a printer 510. Thus, the starting material 515 may be optically designed and/or functionalized. The starting material may, alternatively, or additionally, also be coated or flock coated, etc. The starting material may be a sheet material.

Step 2 shows a cutting of portion 520 for a flexible sock element 521 from the processed starting material 515. When using a sheet material as starting material 515, a multitude of portions 520 may be cut out in a continuous manufacturing process. The cutting out may, for example, be carried out by laser cutting. Alternatively, the portion 520 for flexible sock element 521 may also be die cut.

Step 3 shows a closing of the portion 520. The closing may be carried out automatically by a robot arm 530, or the closing may be carried out semi-automatically. By closing the portion 520, which may be fabricated to be flat, a flexible sock element 521 is provided, which encompasses the foot. The flexible sock element 521, which is shown in step 4, is applied onto a fixation element, for example, pulled over a last.

In an injection molding step, a reinforcing element 550 is injected onto the flexible sock element 521 as shown in step 5. The reinforcing element 550 covers the sole portion of the flexible sock element 521 and extends to and/or onto the upper region of the sock element 521. The reinforcing element 550 may be arranged continuously, i.e. without through holes. The reinforcing element 550 may fully cover the upper region of flexible sock element 521 to form the upper of the final shoe (cf. step 8). The reinforcing element 550 may have thickenings 551 at the sole portion of the flexible sock element 521. The thickenings 551 may be arranged in regions, in which profile elements are to be placed at the shoe, as explained above with reference to FIG. 2.

In step 6, studs 560 are injected onto thickenings 551. In further embodiments, different and/or further profile elements may be provided. In particular, profile elements may also be injected without thickenings 551. In other embodiments, the profile elements may be clipped on, or they may be placed only at the reinforcing element 550.

In step 7, a sole element 570 is injected onto the reinforcing element 550. The sole element 570 may be injected through at least one of the profile elements 560, as, for example, explained above with reference to FIG. 2. The sole element 570 may have a stiffening element 575 below the arch of the foot. The stiffening element 575 may, for example, be provided by injection in or around a recess and/or an elevation, respectively, on the reinforcing element 551, which may be provided as explained above. The sole element 570 may also extend to and/or into the upper region of flexible sock element 521. For example, the sole element 570 may be arranged in the heel region, in order to further strengthen the shoe. Optionally, the sole element 570 may extend around the foot around a lower region of the upper region. The sole element 570 may be arranged as an outsole element or a complete outsole. Alternatively, an outsole element or an outsole may be attached to sole element 570, for example, by pressing or gluing.

Steps 8 and 9 relate to the provision of a laced fastening on the shoe. In step 8, a part 580 of the upper region of the flexible sock element 521, around which the laced fastening is to be provided, is cut out.

This may be carried out by laser cutting or die cutting, etc. In step 9, holes 591 for the laces are created in the flexible sock element 521, for example, by die cutting. Moreover, a tongue 590 may be attached to the flexible sock element 521, such as by stitching.

In step 10, a removable insole 593 is inserted into the shoe. The insole 593 may, for example, have a lining. Moreover, insole 593 may have a sole portion, in order to provide a further improved foot bed. Optionally, lacings may be inserted into holes 591.

In step 11, a right shoe and a left shoe are packed by a casing 599.

Steps 1-11 may be carried out in a fully automated manner. For example, they may be part of an on demand fabrication process, in which a pair of shoes or a shoe is fabricated subsequent to an order and/or in a customized manner. The fabrication process may be carried out in an automated manner in a factory, and the shoes may be shipped subsequently. The fabrication process may, however, also be carried out in a sporting goods store and/or in a shoe store. Due to the automated fabrication, fast and individual manufacturing directly following the demand of a customer is enabled. According to at least one of steps 1-11, as described above, for example a business model regarding on demand order/fabrication may be established.

Figure 6A:
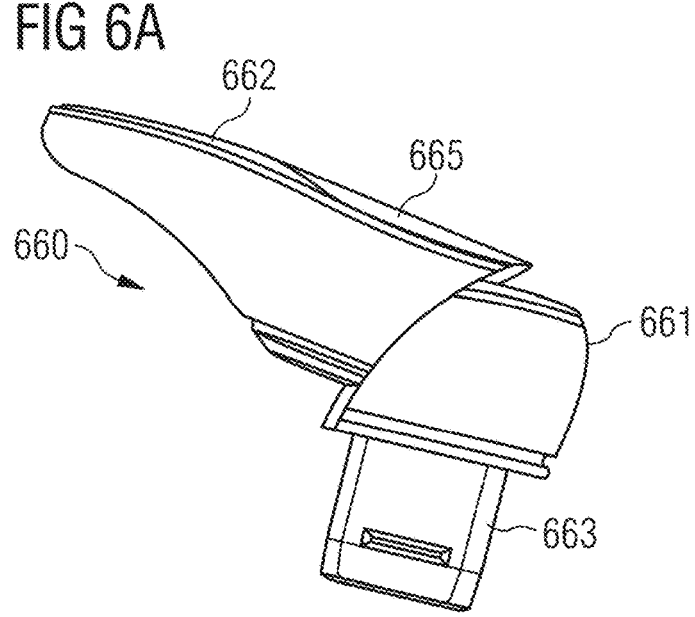
FIGS. 6A-C show the steps of applying a flexible sock element onto a multi-part fixation element.
Figure 6B:
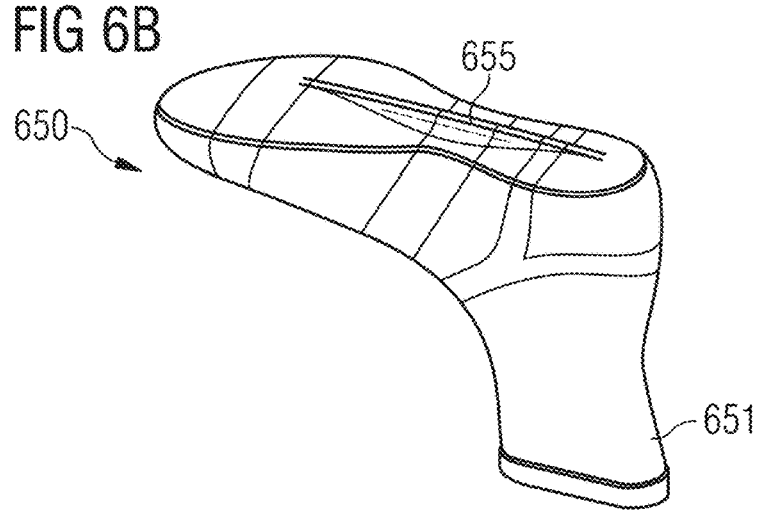
Figure 6C:
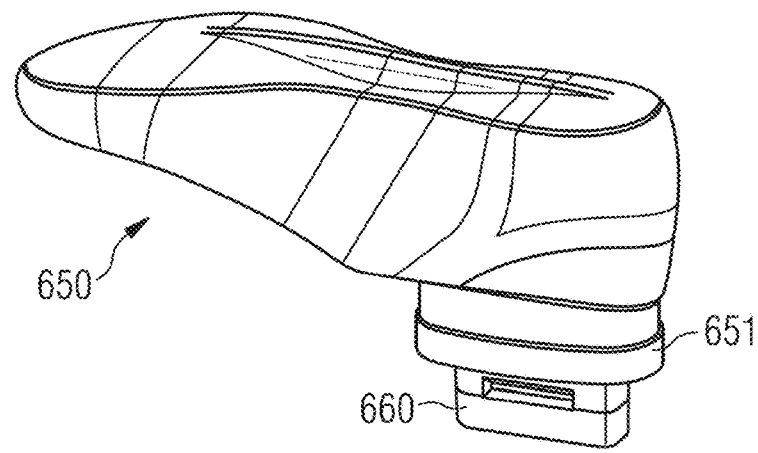

FIGS. 6A-C show the application of a flexible sock element 650 onto a multi-part fixation element 660. FIG. 6A shows a two-part fixation element 606D, which comprises a last. The fixation element 660 has a heel portion 661 and a toe and instep portion 662, respectively, which form the last. These two portions may be fitted into each other and out of each other, respectively. Toe and instep portions 662 having different sizes may be provided, in order to adapt the size of the last to the size of the respective flexible sock element 650, which has to be processed. The instep portion 662 and optionally the heel portion 661 may jointly comprise a bulge 665 at the side, which is designated for the sole portion of the flexible sock element 650. The bulge 665 may be designated to provide a protrusion on the flexible sock element 650 or to be arranged in a protrusion of the flexible sock element 650. Alternatively, or additionally, the flexible sock element 650 or the fixation element 660 may have an indentation or recess, respectively. The heel portion may have an attachment portion 663, which may be arranged to be elongate. The attachment portion 663 may enable the fixation element to be inserted into a mechanism for injection molding manually or in an automated manner.

FIG. 6B shows a flexible sock element 650, which may be provided, for example, as explained above with reference to FIG. 3. The flexible sock element 650 may, in particular, have a protrusion 655. Prior to applying the flexible sock element 650 to the fixation element 660, an optionally provided portion 651 of the flexible sock element 650, which extends beyond the region of the ankle of the foot, may be folded.

FIG. 6C shows the flexible sock element 650 with folded portion 651 as it may be placed on the fixation element 660. The provision of the fixation element 660 as a multi-part element may facilitate the placement of the flexible sock element 650 onto the fixation element 660. Prior to placing the flexible sock element 650, a sole plate element may be placed within flexible sock element 650. Prior to, or after the placing, alternatively, or additionally, a sole plate element may be placed on an outer side of the flexible sock element 650. At least one of the sole plate elements and/or the fixation element may enable a protrusion and/or an indentation to be provided and/or supported at the flexible sock element 650, as explained above.

Figure 7A:
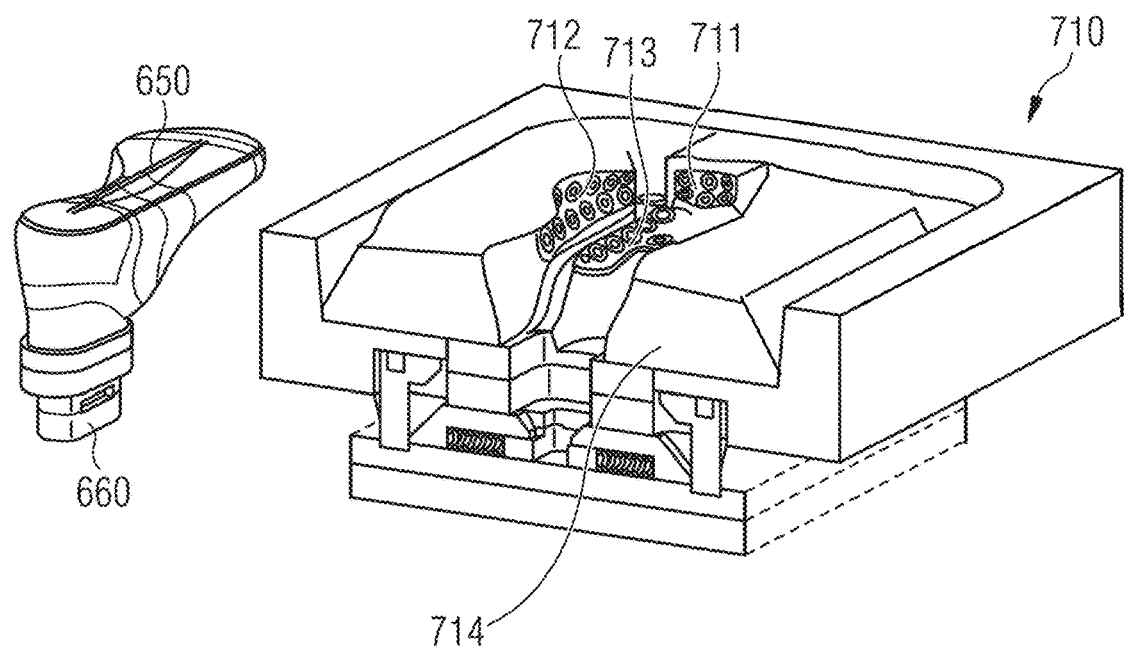
FIGS. 7A-O show a method for fabricating a shoe with a flexible sock element in an apparatus having a fixation element and a mechanism for injection molding with a mold for injection molding comprising at least three parts.
Figure 7B:
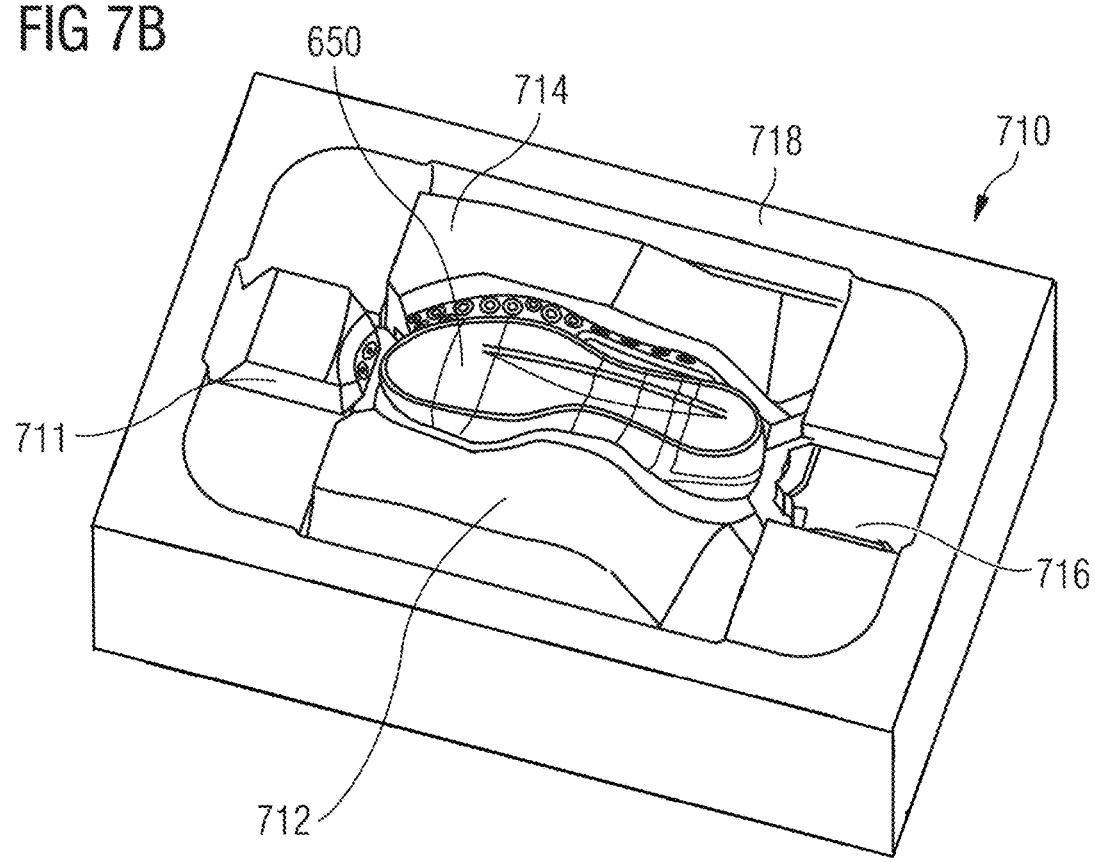
Figure 7C:
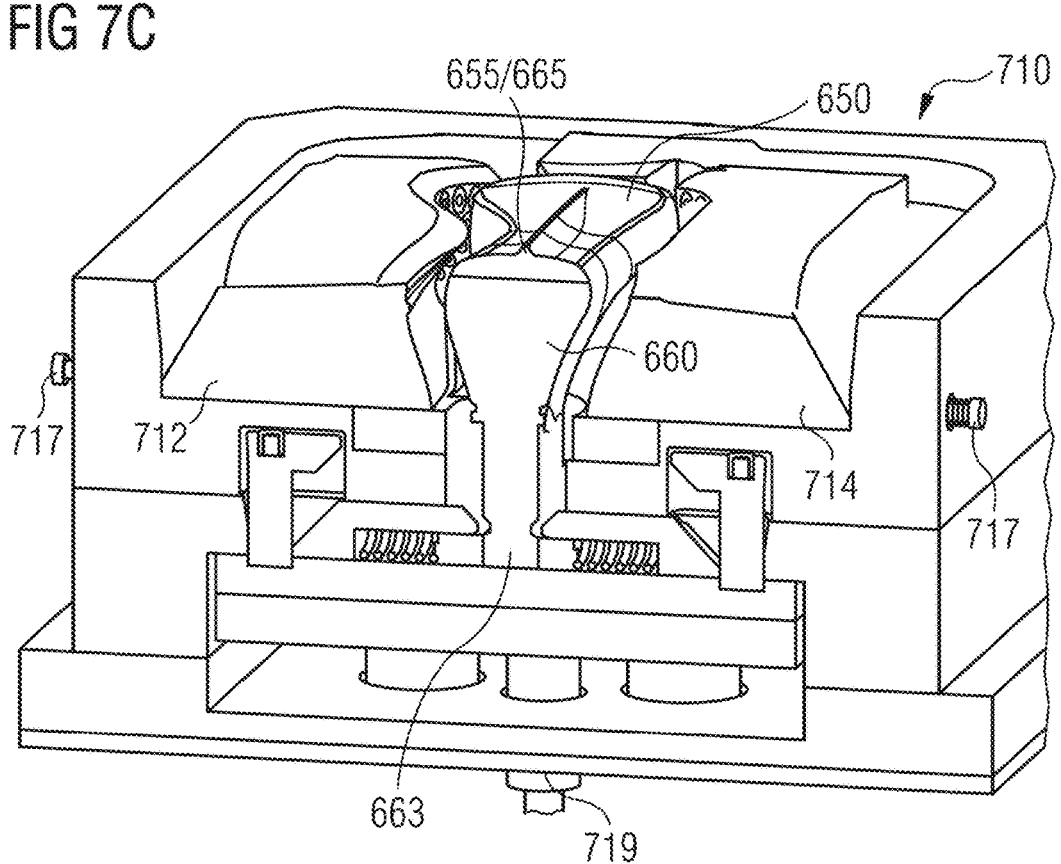
Figure 7D:
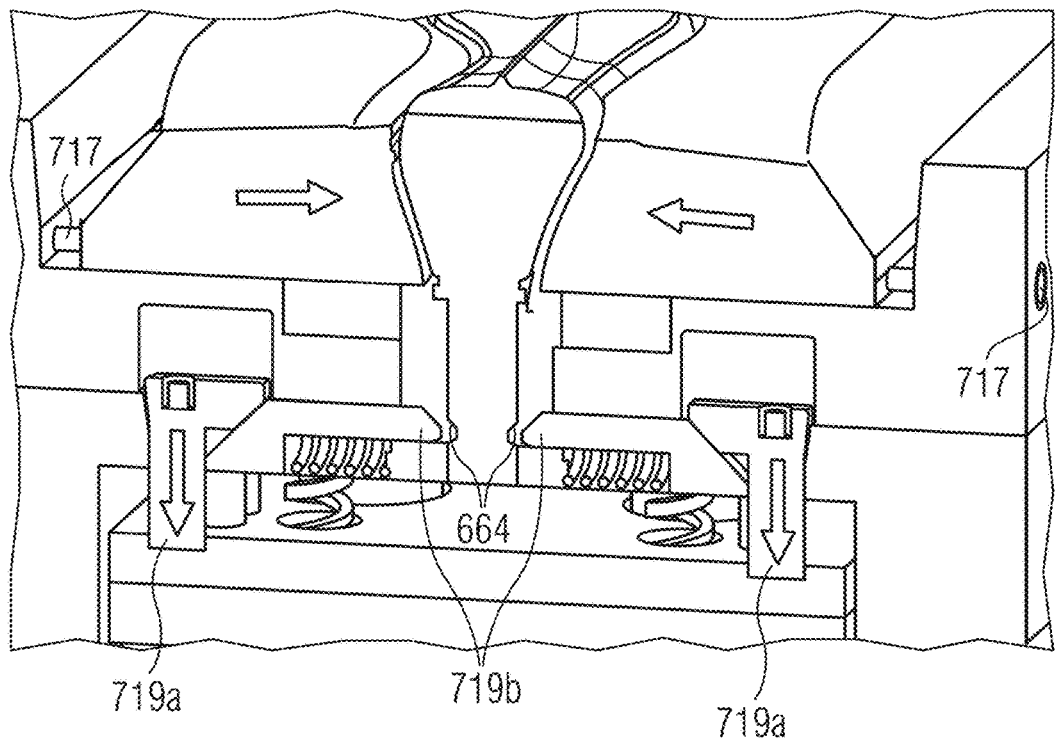
Figure 7E:
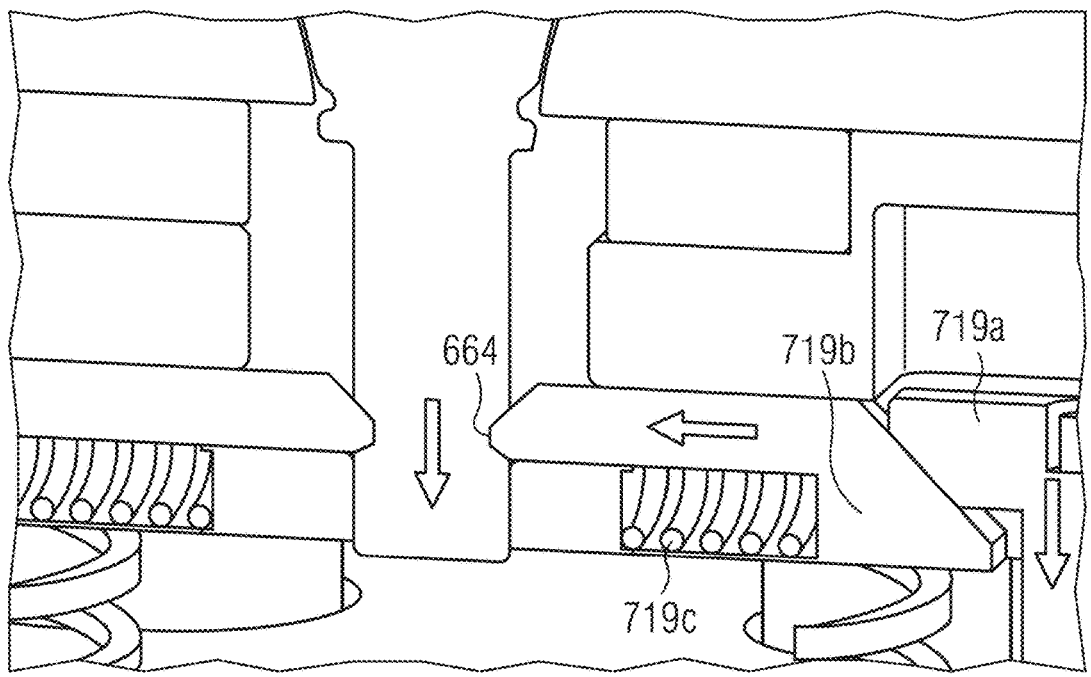
Figure 7F:
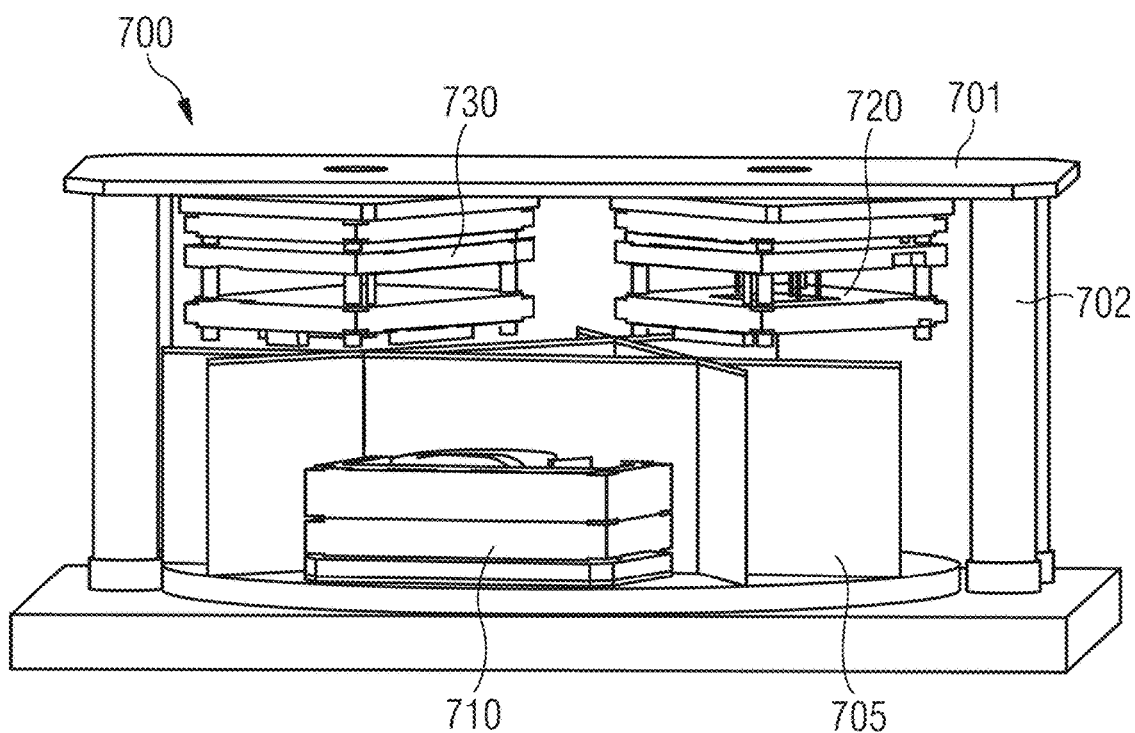
Figure 7G:
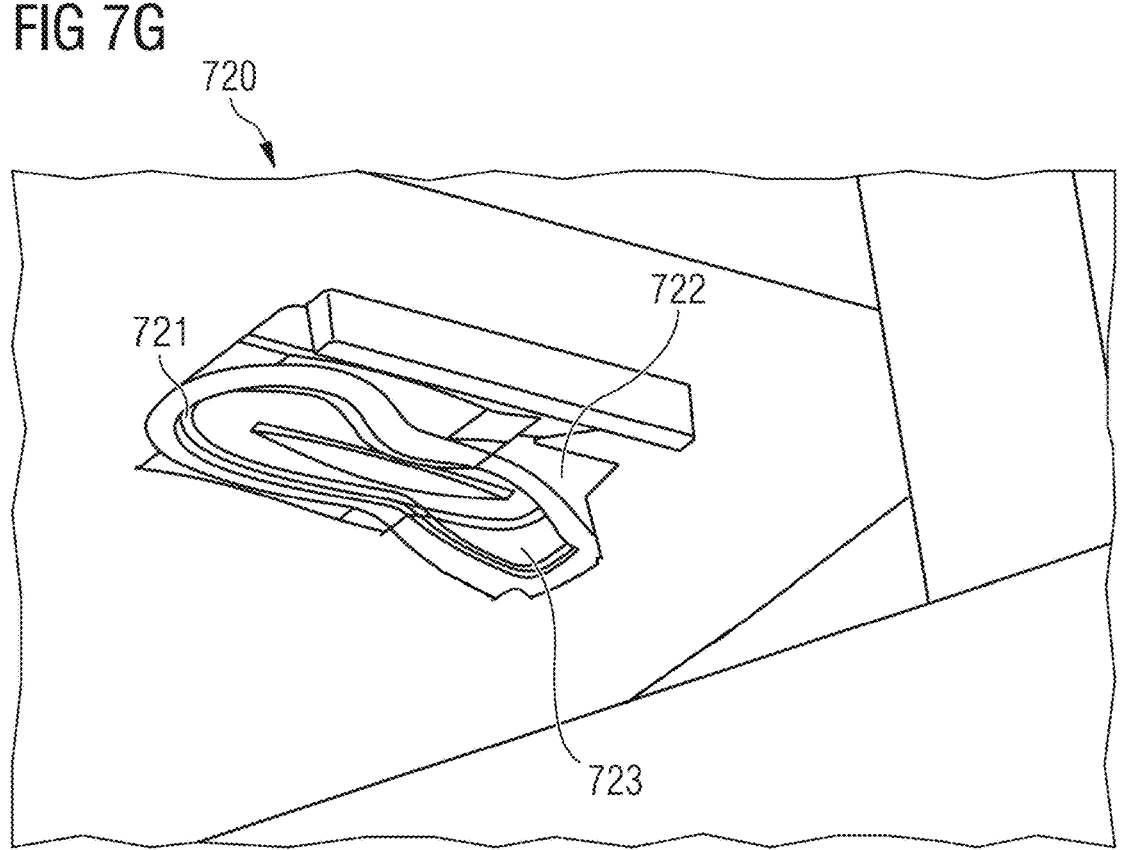
Figure 7H:
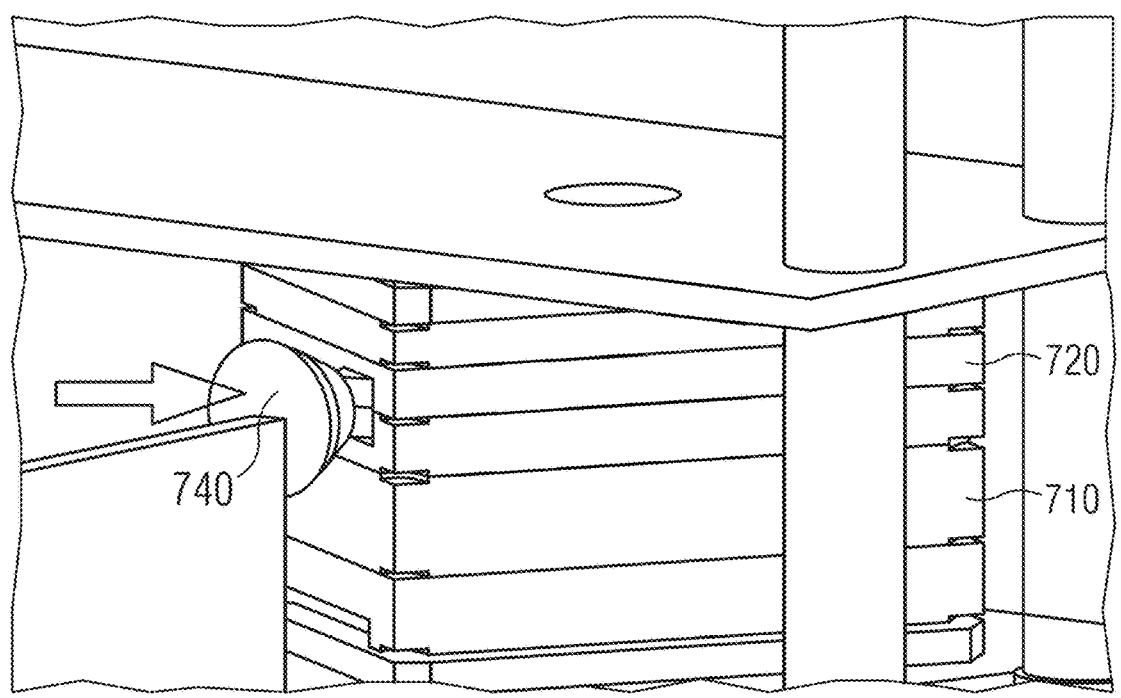
Figure 7I:
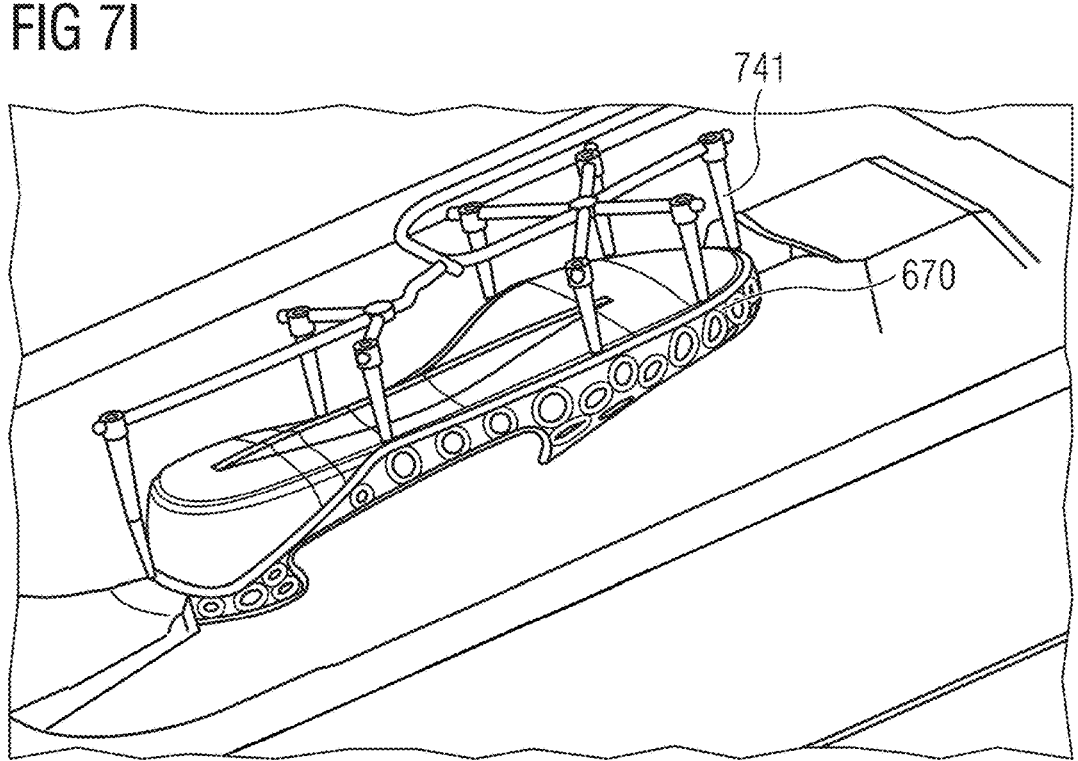
Figure 7K:
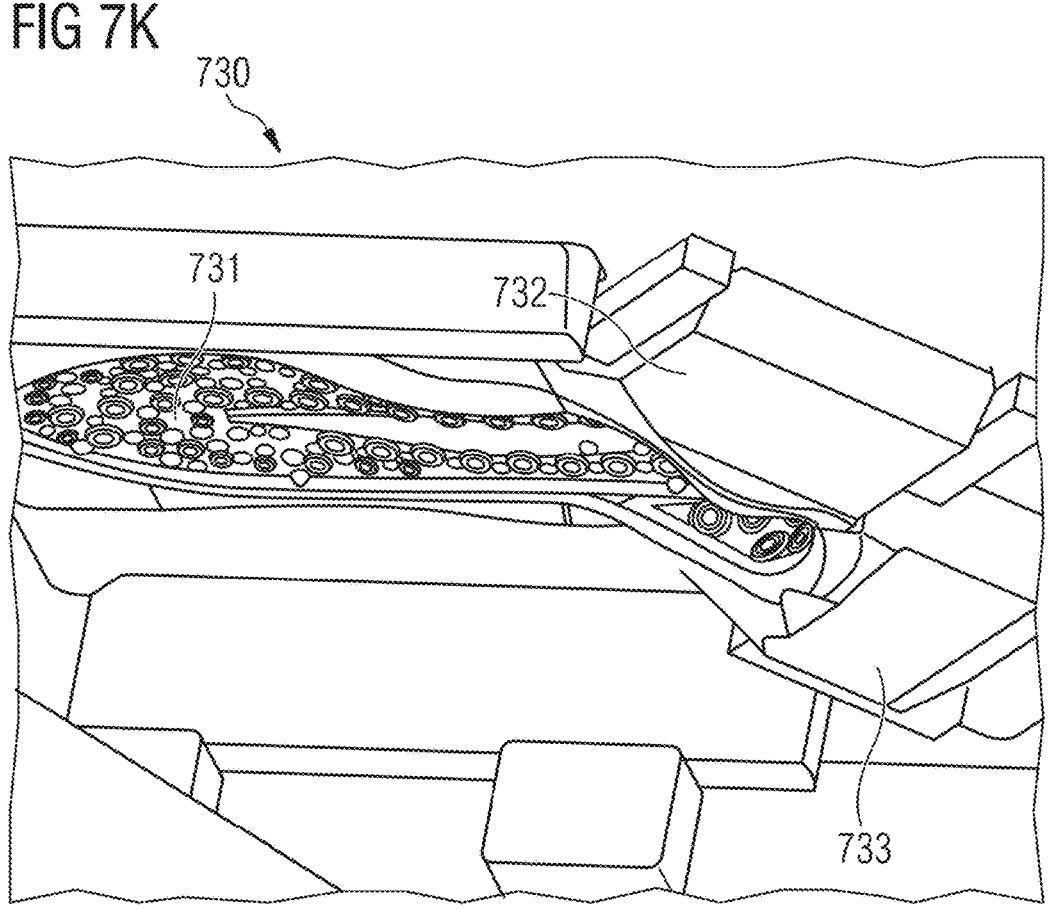
Figure 7L:
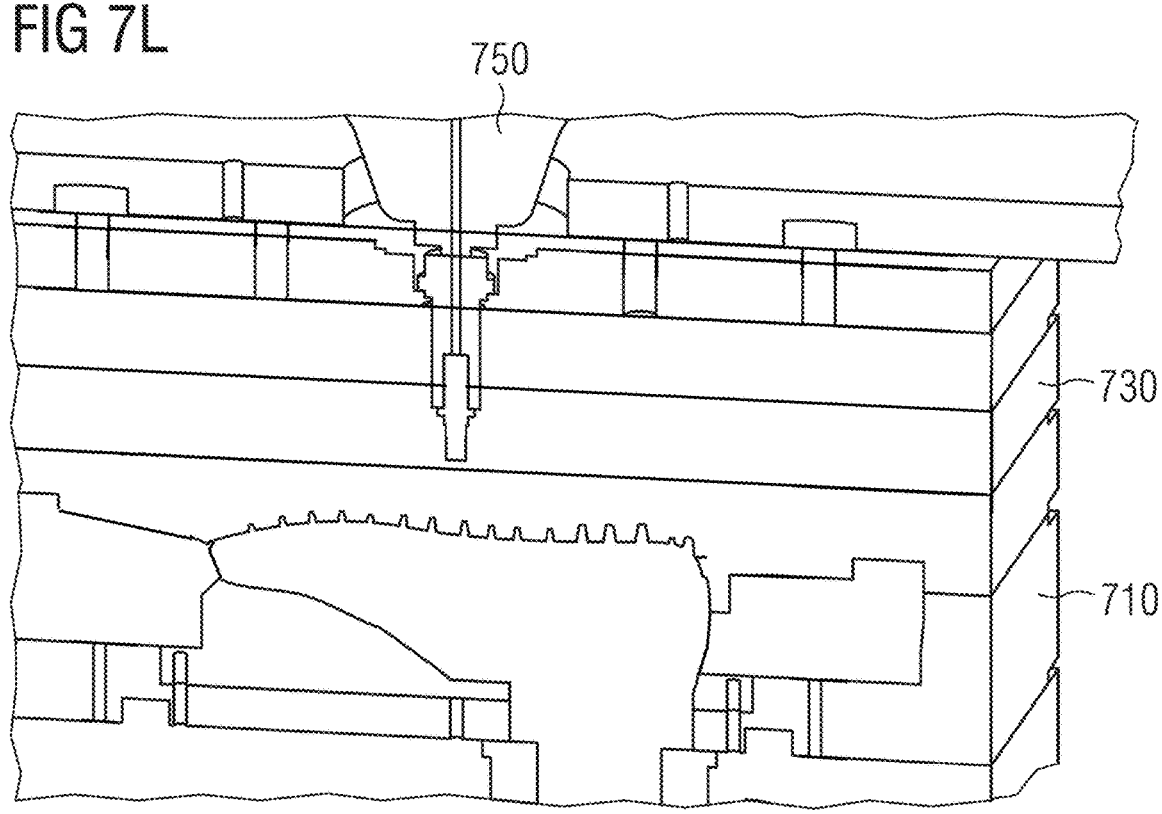
Figure 7M:
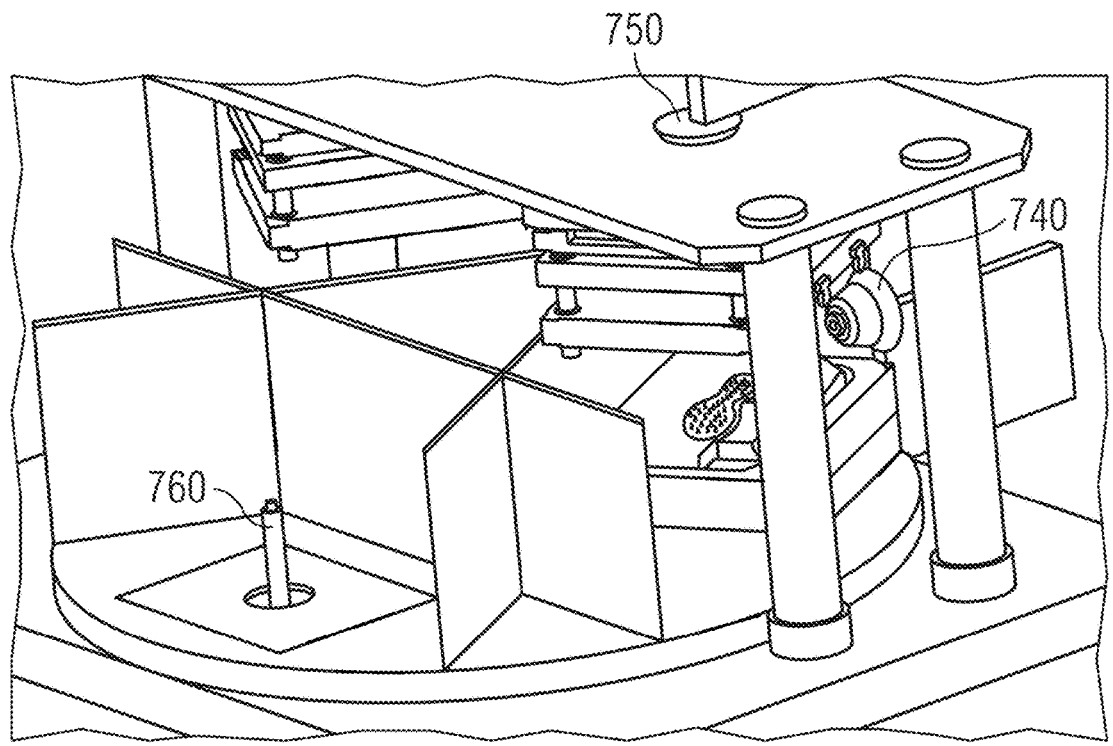
Figure 7N:
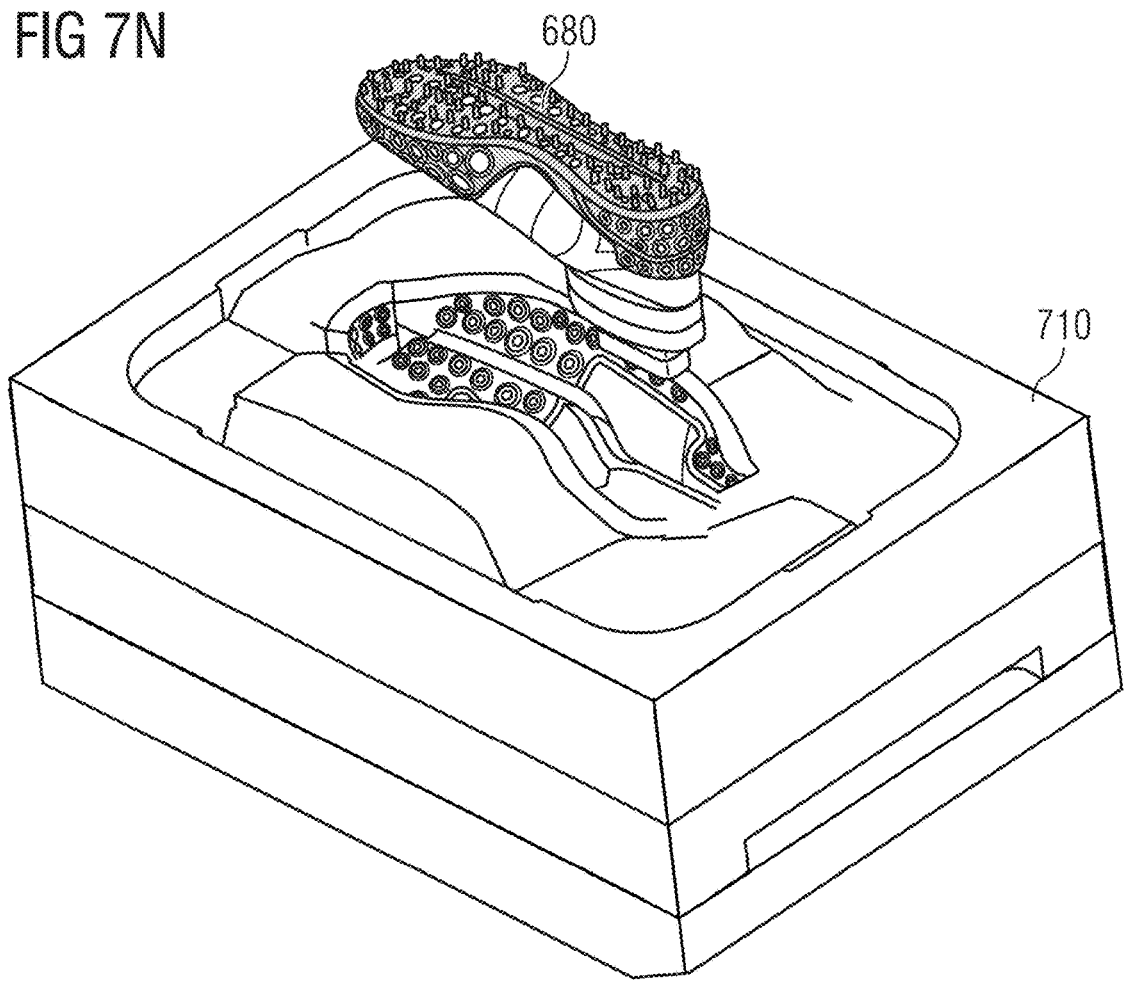

FIGS. 7A-N show a method for fabricating a shoe with a flexible sock element in an apparatus having a fixation element and a mechanism for injection molding with a mold for injection molding having at least three parts.

In FIG. 7A, an exemplary flexible sock element 650 (cf. FIG. 6A-C) placed on the exemplary fixation element 660 is inserted into a first lateral mold for injection molding 710, which is illustrated in a cross sectional view. The lateral mold for injection molding 710 has several lateral mold parts, including a lateral front mold part 711 and a lateral rear mold part 716 (not shown in FIG. 7A; cf. for example FIG. 7B). Moreover, the lateral mold for injection molding 710 also has top and bottom lateral mold parts 712 and 713, respectively, which are shown on the left side of FIG. 7A, and a top lateral mold part 714, which is shown on the right side of FIG. 7A. The lateral mold for injection molding 710 may have a further lateral bottom mold part, which may be arranged below the mold part 714, but is not shown in FIG. 7A. In other embodiments, more or less or differently arranged lateral mold parts may be provided. The lateral mold for injection molding 710 may optionally have a frame, below which the lateral mold parts are arranged. The lateral mold parts 711, 712, 714 and 716 are each adapted to be laterally movable with respect to each other. Optionally, some of these lateral mold parts may be combined with other lateral mold parts, such that a lateral mold for injection molding may be provided in a modular manner from a plurality of different lateral mold parts. At least one of the mold parts may then be used for different lateral molds for injection molding.

FIG. 7B shows a top view of the lateral mold for injection molding 710 with its mold parts 711, 712, 714, 716 and frame 718.

FIG. 7C shows a cross section of the lateral mold for injection molding 710 with inserted fixation element 660 and flexible sock element 650. The fixation element may, for example, comprise a bulge 665, which arranges itself in a protrusion 655 of the flexible sock element, or which provides the protrusion 655 of the flexible sock element, respectively. After correctly positioning and/or fixing the fixation elements 660 in the lateral mold for injection molding 710, for example, by its optional attachment portion 663, the lateral mold for injection molding 710 is closed. To this end, the lateral mold for injection molding 710 has a lateral device for closing 717. The lateral device for closing 717 may, for example, have at least one bolt and/or at least one piston, and a device for restoring, such as at least one spring.

The lateral device for closing 717 moves the lateral top mold parts 712 and 714 towards each other. For example, lateral top mold parts 712 and 714 are moved symmetrically toward each other. The lateral bottom mold parts 713 may be closed jointly with the lateral top mold parts 712 and 714 or separately with their own device for closing. The front and rear lateral mold parts 711 and 716, respectively, may optionally be closed by their own corresponding device for closing. In FIG. 7C, the device for closing 717 is shown in an open state.

In FIG. 7D, the device for closing 717 is shown in a closed state. Moreover, as shown in FIG. 7D, the fixation elements 660 may be moved (in FIG. 7D downwards) such that the sole portion of the flexible sock element 650 moves in a direction towards a center of the cavity, which is formed by the lateral mold parts 711-716. This movement of the fixation element 660 may occur simultaneously with the movement of the lateral mold parts 711-716 or subsequently. To this end, a vertical device for closing 719 is provided, which has at least one piston or bolt and a device for restoring as the lateral device for closing 717. FIG. 7D shows that the lateral mold for injection molding 710 may have a lever mechanism, which transforms the vertical movement of the device for closing 719 into a vertical movement of the attachment portion 663. During their downward movement, the two levers 719a press onto the sliders 719b, such that the sliders 719b are pushed into the notches 664 of the attachment portion 663. The sliders 719b and the notches 664 are adapted such that the attachment portion 663 moves downwards a predetermined amount, if the sliders 719b are fully pressed into the notches 664.

This position is shown in FIG. 7E. Thus, a fine positioning of the fixation element 660 within the lateral mold for injection molding 710 is enabled. The sliders 719b may have a device for restoring, such as a spring 719c.

FIG. 7F shows the lateral mold for injection molding 710 within the mechanism for injection molding 700. The mechanism for injection molding 700 has a movable (for example rotatable) rack, and the lateral mold for injection molding 710 is arranged within the rack. A plurality of lateral molds for injection molding 710 may be arranged within the rack, wherein the lateral molds may be separated by walls 705. Above the rack, at least one of the top mold parts 720 and 730 may be placed on a carrier 701. The top mold parts 720 and 730 may be placed in a hanging manner. The lateral mold for injection molding 710 may be moved such that it is placed below a desired top mold part 720 or 730. The carrier 701 may be moved downwardly onto the lateral mold for injection molding 710 along at least one of the columns 702 such that by closing the lateral mold for injection molding 710 and the top mold part 720 or 730, a first mold for injection molding is provided.

FIG. 7G shows a bottom view of the first top mold part 720. The first top mold parts 720 may be adapted to be multi-part. For example, the first top mold part 720 may comprise a left heel part 722, a right heel part 723 and a main part 721. The heel parts 722 and 723 may be arranged to be laterally movable relative to the main part 721. In other embodiments, additional and/or other parts of the first top mold part 720 may be provided. The first top mold part 720 may be constructed in a modular manner from a plurality of parts, as explained above with reference to the lateral mold for injection molding 710. The first top mold part 720 may, alternatively, be provided as one-piece.

FIG. 7H shows the lateral mold for injection molding 710 and the first top mold part 720, which, in a closed state, jointly form a first mold for injection molding. Via a lateral injection head 740 of the mechanism for injections molding 700, a material may be injected into the first mold for injection molding and onto the flexible sock element 650 arranged therein. The injection head 740 may be placed into a corresponding opening of the top mold part. In other embodiments, the injection into the first mold for injection molding may, for example, also occur from the top. Moreover, a plurality of injection heads may also be provided simultaneously. Optionally, further elements, such as a sole plate element described with reference to FIG. 6, may be arranged at the flexible sock element 650, before commencing the injection.

The injection process is schematically shown in FIG. 7I. The first mold for injection molding comprises at least one channel 741 through which the material for an element 670 is injected onto the flexible sock element 650. The material of the element 670 may be locally injected at different positions. The material distributes itself within the cavity formed by the mold for injection molding during the injection. Optionally, the distribution may be supported, for example, by evacuating the cavity. The element 670 may be arranged as a reinforcing element, such as as the reinforcing element 370. The element 670 may, however, also be adapted as a sole element. The geometry of element 670 is defined by the first mold for injection molding, which is formed by the lateral mold for injection molding 710 and the first top mold part 720. In some embodiments according to FIG. 7I, the top mold part serves the purpose of sealing the flexible sock element 650 in a region, which has the sole portion and a part of the heel portion of the flexible sock element 650. The material of the element 670 is injected into the cavity defined by the lateral mold for injection molding. In other embodiments, the element 670 may extend across other regions of the flexible sock element 650, such as its entire heel region and/or its sole portion and/or around its protrusion 655. The properties of the element 670 are, at least in part, determined by the respective material, which is used for its injection.

FIG. 7K shows a bottom view of a second top mold part 730. Generally, the second top mold part 730 may be configured similarly as the first top mold part 720 and may differ from the first top mold part 720 only by the design of the shaping portion of second mold part 730.

In some embodiments, the first top mold part 720 may be removed from the lateral mold for injection molding 720 after injecting the element 670. The lateral mold for injection molding 710 may then be moved such that it is placed below the second top mold part 730. Finally, the second top mold part 730 may be moved towards the lateral mold for injection molding 710, such that the second top mold part 730 and the lateral mold for injection molding 710 form a second mold for injection molding. An additional element 680 (cf. FIG. 7O) may be injected onto the flexible sock element 650 by using the second mold for injection molding 730. The shape of the injected additional element 680 is defined by the second mold for injection molding. The additional element 680 may be adapted as an outsole element, such as outsole element 380. The material for the additional element 680 may be injected into the second mold 730 for injection molding using an injection head 750 from the top. Alternatively, the material may also be injected laterally, as explained above with reference to FIG. 7H. An injection head 750 for injecting from the top may be provided above the first top mold part 720 as well as above the second top mold part 730. Moreover, an injection head 740 for injecting from the side may be provided. Alternatively, it is also possible that only one injection head for lateral injection and/or for injection from the top is provided at at least one of the top mold parts. Optionally, the injection head 740, 750 is adapted to be movable and/or rotatable.

FIG. 7M shows the mechanism for injection molding 700 with a device 760 for removing the fixation element 660 from the mechanism for injection molding 700. The device 760 may be arranged as a bolt or piston, in order to push the fixation element out of the lateral mold for injection molding 710 in a vertical direction towards the top, as shown in FIG. 7M.

Figure 7O:
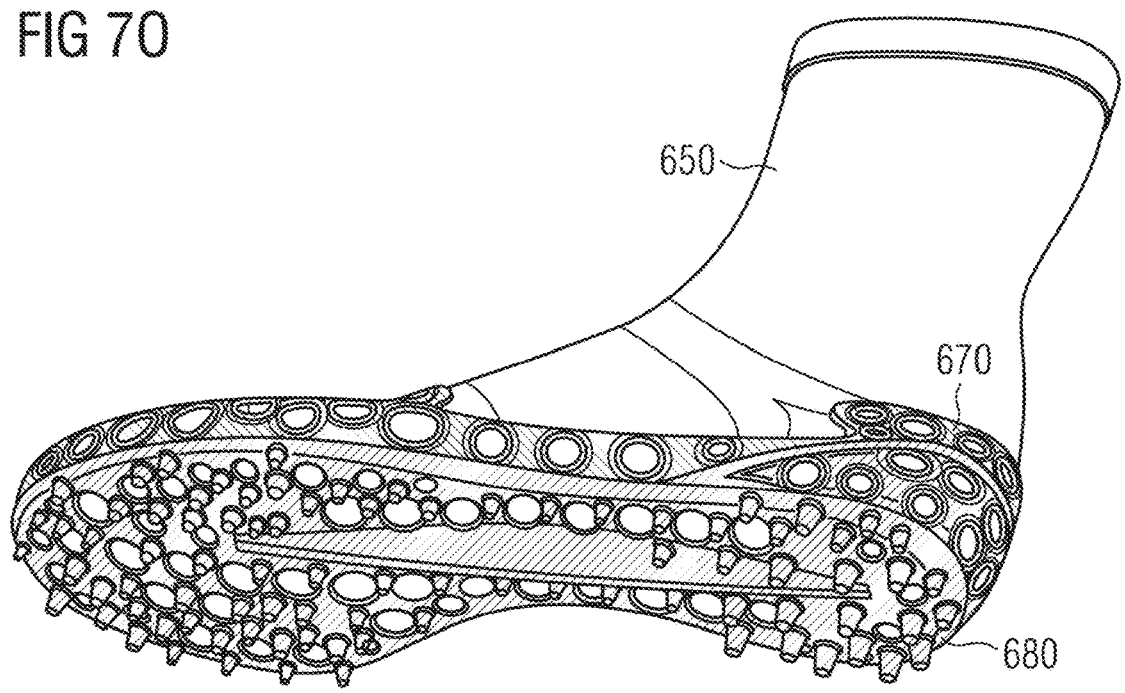

FIG. 7O shows a view of the flexible sock element 650 with an injected first element 670 and an injected second element 680. A shoe 300, as explained above with reference to FIG. 3, may be fabricated by the described method and/or the described apparatus. Sole elements with stiffening element, first and second sole elements, profile elements, reinforcing elements, outsole elements, mid sole elements and/or other elements, etc., as described with reference to FIG. 1-5 above, may be injected onto flexible sock elements with or without a sole plate element by correspondingly adapted first and second mold for injection molding and optionally further molds for injection molding.

In the following, further examples are described to facilitate the understanding of the invention:

A method for manufacturing a sole, in particular, for a sports shoe, wherein the method comprises:
providing at least one first sole element (110; 210) and at least one second sole element for the sole;
injecting the at least one second sole element (130; 230) through the at least one first sole element (110; 210).

The method according to example 1, wherein the first sole element (110; 210) comprises a profile element.

The method according to example 2, wherein the profile element (110; 210) comprises at least one stud.

The method according to any of examples 1-3, wherein the first sole element (110; 210) comprises an aperture (120; 220).

The method according to any of examples 1-4 wherein the second sole element (130; 230) comprises at least one of the following synthetic materials: polyamide, polyether-block-amide, polyvinylchloride, polyurethane, and polyvinylchloride.

The method according to any of examples 1-5, wherein the first sole element (110) is provided at a flexible sock element (250).

The method according to any of examples 1-6, wherein the flexible sock element (250) comprises a textile, in particular a knitted fabric.

The method according to example 6 or example 7, wherein the flexible sock element (250) comprises at least one of the following materials: polyamide, polyester, cotton, polyurethane, leather.

The method according to any of examples 1-8, wherein the second sole element (130) forms an outsole element.

The method according to any of examples 1-9, further comprising the step of injecting a reinforcing element (140; 240) for the flexible sock element (250).

The method according to example 10, wherein the providing the first sole element (110) at the flexible sock element (250) comprises a injecting or clipping of the first sole element (110; 210) on the reinforcing element (140; 240).

The method according to example 10 or example 11, wherein the second sole element (130; 230) is injected such that it is at least in part arranged between the reinforcing element (140, 240) and the first sole element (110, 210).

The method according to any of examples 10-12, wherein the reinforcing element (140; 240) is injected such that it extends until an upper region of the flexible sock element (250).

The method according to any of examples 10-13, wherein the second sole element (130; 230) is harder and/or more abrasion resistant and/or stiffer than the reinforcing element (140; 240).

The method according to any of examples 9-14, wherein the reinforcing element (140; 240) comprises a Shore-A hardness of approximately 25 to 75, in particular of 35 to 55, or 40 to 50.

The method according to any of examples 1-15, wherein the first sole element (110; 210) comprises a Shore-A hardness of approximately 55 to 95, in particular 60 to 95, or 85 to 95.

The method according to any of examples 1-16, wherein the second sole element (130; 230) comprises a Shore-A hardness of approximately 60 to 100, in particular 70 to 90 or 75 to 85.

A sole, in particular for a sports shoe, comprising:
at least one first sole element (110; 210) and at least one second sole element (130; 230);
wherein the at least one second sole element (130; 230) is injected through the at least one first sole element (110; 210).

The sole according to example 18, wherein the sole is manufactured according to a method of any of examples 1-17.

A shoe with a sole according to example 18 or example 19.

A method for manufacturing a shoe, in particular a sport shoe, wherein the method comprises:
providing a flexible sock element (350; 450; 521);
injecting at least one sole element (380; 480; 570) on the flexible sock element (350; 450; 521), such that the at least one sole element (380; 480; 570) comprises a stiffening element (385; 485; 575) below the arch of the foot.

The method according to example 21, wherein the stiffening element (385; 485; 575) is aligned along a longitudinal direction of the shoe.

The method according to example 21 or example 22, wherein the stiffening element (385; 485; 575) extends from below the heel until below the metatarsals.

The method according to any of examples 21-23, wherein the at least one sole element (380; 480; 570) is injected such that it extends until an upper region (352) of the flexible sock element (350; 450; 521).

The method according to any of examples 21-24, wherein the flexible sock element (350) is provided with a protrusion (355) and/or an indentation, and a sole element (380) is injected such that it at least in part encompasses the protrusion (355) and/or it at least in part penetrates into the indentation, to provide a form-fitting connection.

The method according to example 25, further comprising the step of applying the flexible sock element (350) onto a fixation element, which is arranged to provide the protrusion (355) and/or the indentation of the flexible sock element (350).

The method according to example 25 or example 26, wherein the flexible sock element (350) is provided such that the protrusion (355) and/or the indentation of the flexible sock element (350) is at least in part pre-formed.

The method according to any of examples 25-27, further comprising the step of providing a sole plate element (360) at the flexible sock element (350) for forming the protrusion (355) and/or the indentation of the flexible sock element (350).

The method according to any of examples 21-28, wherein the method further comprises the step of providing a sole plate element (360) with an elevation (365) and/or a recess at the flexible sock element (350), and the at least one sole element (380) is injected, such that it at least in part encompasses the elevation (365) and/or it at least in part penetrates into the recess to provide a form-fitting connection.

The method according to any of examples 21-29, wherein the at least one sole element is configured as a reinforcing element for the flexible sock element, and wherein the method further comprises the step of injecting an outsole element on the reinforcing element.

The method according to any of examples 21-29, wherein the sole element (380; 480; 570) is configured as outsole element.

The method according to example 31, further comprising: injecting of a reinforcing element (370; 470; 550) on the flexible sock element (350; 450; 521) before the injecting of the outsole element (380; 480; 570).

The method according to example 30 or example 32, wherein the outsole element (380; 480; 570) is harder and/or more abrasion-resistant and/or stiffer than the reinforcing element (370; 470; 550).

The method according to any of example 30, example 32, or example 33, wherein the stiffening element (370; 470; 550) comprises a Shore-A hardness of approximately 25 to 65, in particular 35 to 55 or 40 to 50.

The method according to any of example 30, or any of examples 32-34, wherein the reinforcing element (370; 470) comprises at least one through hole (371; 471).

The method according to any of examples 30-35, wherein the outsole element (380; 480; 570) comprises a Shore-A hardness of approximately 60 to 100, in particular 70 to 90 or 75 to 85.

A shoe, in particular sport shoe, comprising:
a flexible sock element (350; 450; 521);
at least one sole element (380; 480; 570), which is injected on the flexible sock element (350; 480; 521), and which comprises a stiffening element (385; 485; 575) below the arch of the foot.

The shoe according to example 37, manufactured with a method according to any of examples 21-36.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:
1. A sole comprising:
a flexible sock element having an upper region and a sole portion;

a reinforcing layer formed as an injected component positioned onto the sole portion of the flexible sock element;

at least one first sole element attached onto the reinforcing layer; and at least one second sole element discrete from the reinforcing layer and formed as an injected piece extending through the at least one first sole element such that the at least one second sole element penetrates the at least one first sole element to provide a form-fitting connection between the at least one first sole element and the reinforcing layer, and the at least one second sole element extends through the at least one first sole element to the reinforcing layer to secure the at least one first sole element to the reinforcing layer;

wherein the reinforcing layer is arranged as a barrier to entirely separate the at least one second sole element from the flexible sock element.

2. The sole according to claim 1, wherein at least one of:
the at least one second sole element forms at least a portion of an outsole element; or
the at least one second sole element comprises a stiffening element located at a region below an arch of a foot.

3. The sole according to claim 1, wherein the sole is incorporated into a shoe, wherein the at least one second sole element injected through the at least one first sole element extends beyond a bottom periphery of the shoe and at least partially upward around at least a portion of an upper of the shoe.

4. A shoe comprising the sole according to claim 1.

5. The sole of claim 1, wherein at least one of:
at least a part of the at least one second sole element remains in the at least one first sole element; or
the at least one second sole element comprises at least one of the following synthetic materials: polyamide, polyether-block-amide, polyvinylchloride, polyurethane, and polyvinylchloride.

6. The sole of claim 1, wherein at least one of:
the at least one first sole element comprises a profile element or an aperture;
the flexible sock element comprises a textile;
the reinforcing layer comprises a Shore-A hardness of approximately 25 to 75; or
the at least one first sole element comprises a Shore-A hardness of approximately 55 to 95 and the at least one second sole element comprises a Shore-A hardness of approximately 70 to 90.

7. The sole of claim 1, wherein the at least one first sole element being attached onto the reinforcing layer comprises the at least one first sole element being injected or clipped onto the reinforcing layer.

8. A sole comprising:
at least one first sole element;
at least one second sole element, wherein the at least one second sole element is injected through the at least one first sole element;
a flexible sock element; and
a reinforcing element injected onto the flexible sock element and discrete from the at least one second sole element;
wherein the at least one first sole element is clipped onto the reinforcing element;
wherein the first sole element being clipped onto the reinforcing element includes the first sole element being clipped by a mandrel of the first sole element being received in a notch in the reinforcing element; and
wherein the at least one second sole element is injected through the at least one first sole element such that the at least one second sole element penetrates the first sole element to provide a form-fitting connection between the first sole element and the second sole element and the at least one second sole element extends to the reinforcing element and secures the first sole element to the reinforcing element.

9. A shoe comprising the sole according to claim 8.

10. The sole of claim 8, wherein at least one of:
the at least one second sole element forms at least a portion of an outsole element;
at least a part of the at least one second sole element remains in the at least one first sole element; or
the at least one second sole element comprises at least one of the following synthetic materials: polyamide, polyether-block-amide, polyvinylchloride, polyurethane, and polyvinylchloride.

11. The sole of claim 8, wherein at least one of:
the at least one first sole element comprises a profile element or an aperture;
the flexible sock element comprises a textile;
the reinforcing element comprises a Shore-A hardness of approximately 25 to 75; or
the at least one first sole element comprises a Shore-A hardness of approximately 55 to 95 and the at least one second sole element comprises a Shore-A hardness of approximately 70 to 90.

\* \* \* \* \*